US011980589B2

(12) United States Patent
Phipps et al.

(10) Patent No.: US 11,980,589 B2
**(45) Date of Patent: *May 14, 2024**

(54) TROCHE MOLD ASSEMBLY

(71) Applicant: DoseLogix, LLC, Woodstock, GA (US)

(72) Inventors: Timothy Gayle Phipps, Woodstock, GA (US); Daniel Lee DeYoung, Woodstock, GA (US); Matthew Beyer, Acworth, GA (US); Joe Quattrini, Woodstock, GA (US); David Gale, Kennesaw, GA (US); Kevin Green, Atlanta, GA (US); Taylor Davis, Seattle, WA (US); Craig Cochran, Atlanta, GA (US)

(73) Assignee: DOSELOGIX, LLC, Woodstock, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,591

(22) Filed: Jul. 19, 2022

(65) Prior Publication Data

US 2022/0354748 A1 Nov. 10, 2022

Related U.S. Application Data

(63) Continuation of application No. 15/929,649, filed on May 14, 2020, now Pat. No. 11,426,330.

(Continued)

(51) Int. Cl.

*B65D 83/04* (2006.01)
*A61J 3/06* (2006.01)

(Continued)

(52) U.S. Cl.

CPC ................. *A61J 3/06* (2013.01); *B65D 11/12* (2013.01); *B65D 25/04* (2013.01); *B65D 75/58* (2013.01); *B65D 83/0445* (2013.01)

(58) Field of Classification Search

CPC ........ B65D 25/04; B65D 75/58; B65D 83/04; B65D 83/0445; A61J 1/03; A61J 3/06; A61J 7/0069

(Continued)

(56) References Cited

U.S. PATENT DOCUMENTS

| | | | | |
|---|---|---|---|---|
| 3,054,503 A | | 9/1962 | Hartman, Jr. et al. | |
| 3,804,330 A | * | 4/1974 | Miller, Jr. ........... | A01M 1/2055 239/34 |

(Continued)

OTHER PUBLICATIONS

U.S. Appl. No. 15/929,649 , "Advisory Action", dated Mar. 24, 2022, 5 pages.

(Continued)

*Primary Examiner* — Luan K Bui

(74) *Attorney, Agent, or Firm* — Kilpatrick Townsend & Stockton LLP

(57) ABSTRACT

A troche mold assembly includes a cover defining a receiving area and a tray removably positioned in the receiving area. The tray includes a frame having a top side and a bottom side opposite from the top side. The frame defines a plurality of cells, and each cell is configured to receive a medicament. The tray also includes a plurality of buttons. Each button is within a corresponding cell and is between the top side and the bottom side of the frame. In some aspects, wherein each button includes a center portion, a first hinge line adjacent to the cell wall, and a second hinge line between the first hinge line and the center portion. In various aspects, the cover includes a locating rib, and the tray is removably positioned within the receiving area such that the locating rib contacts the top side of the frame.

18 Claims, 10 Drawing Sheets

Related U.S. Application Data

(60) Provisional application No. 62/848,264, filed on May 15, 2019.

(51) Int. Cl.
*B65D 6/06* (2006.01)
*B65D 25/04* (2006.01)
*B65D 75/58* (2006.01)

(58) Field of Classification Search
USPC .......................... 206/1.5, 468, 531, 538, 539
See application file for complete search history.

(56) References Cited

U.S. PATENT DOCUMENTS

| | | | | | |
|---|---|---|---|---|---|
| 3,888,350 | A * | 6/1975 | Horvath | B65D 43/12 | 220/345.3 |
| 4,574,954 | A * | 3/1986 | Reid | B65D 75/327 | 206/532 |
| 4,817,819 | A * | 4/1989 | Kelly | B65D 83/0463 | 221/25 |
| 5,275,291 | A * | 1/1994 | Sledge | B65D 83/04 | 220/348 |
| 5,620,109 | A * | 4/1997 | Madden | B65D 83/04 | 206/536 |
| 5,954,204 | A | 9/1999 | Grabowski | | |
| 7,201,275 | B2 * | 4/2007 | Nakagawa | B65D 75/327 | 116/DIG. 17 |
| 7,854,325 | B2 | 12/2010 | Bentele | | |
| 7,857,022 | B2 | 12/2010 | Kraeml | | |
| 8,453,840 | B2 | 6/2013 | Wharton | | |
| 2004/0055903 | A1 * | 3/2004 | Nishimura | A45C 11/14 | 206/1.5 |
| 2005/0183981 | A1 | 8/2005 | Gelardi | | |
| 2008/0251410 | A1 * | 10/2008 | Gelardi | B65D 83/0463 | 220/661 |
| 2010/0243509 | A1 * | 9/2010 | Gelardi | B65D 83/0463 | 206/536 |
| 2012/0160726 | A1 * | 6/2012 | Gelardi | B65D 83/0463 | 206/467 |

OTHER PUBLICATIONS

U.S. Appl. No. 15/929,649 , “Final Office Action”, dated Jan. 12, 2022, 9 pages.
U.S. Appl. No. 15/929,649 , “Non-Final Office Action”, dated Jul. 21, 2021, 10 pages.
U.S. Appl. No. 15/929,649 , “Notice of Allowance”, dated Apr. 28, 2022, 5 pages.

* cited by examiner

TROCHE MOLD ASSEMBLY

REFERENCE TO RELATED APPLICATION

This application is a continuation of U.S. patent application Ser. No. 15/929,649, filed May 14, 2020, and entitled TROCHE MOLD ASSEMBLY, which claims the benefit of U.S. provisional Patent Application No. 62/848,264, filed on May 15, 2019, and entitled TROCHE MOLD, both of which are hereby incorporated by reference in their entireties.

FIELD OF THE INVENTION

This application relates to a medication dispensers, and, more particularly, to a medication dispenser including one or more unit-dose compartments or cavities.

BACKGROUND

Troche medications are tablet-like lozenges that release medication as the tablet dissolves. A troche mold may define a plurality of cavities. A pharmacist (or other suitable personnel) can prepare a specific dosage by preparing the ingredients for the troche and pouring the mixed ingredients into the cavities of the mold. The mixture can solidify over a set time period to form the solidified troches. After the troches have been prepared, they may be dispensed from the mold to the patient.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a troche mold assembly includes a cover and a tray. The cover defines a receiving area, and the tray is removably positioned in the receiving area. The tray includes a frame having a top side and a bottom side opposite from the top side and that also defines a plurality of cells. Each cell is configured to receive a medicament. The tray also includes a plurality of buttons, where each button is within a corresponding cell between the top side and the bottom side of the frame.

According to various embodiments, a tray for a troche mold assembly includes a frame having a top side and a bottom side opposite from the top side. The frame defines a plurality of cells, and each cell is configured to receive a medicament. The tray also includes a plurality of buttons, where each button is within a corresponding cell between the top side and the bottom side of the frame.

According to certain embodiments, a troche mold assembly includes a cover and a tray. The cover defines a receiving area, and the tray is removably positioned in the receiving area. The tray includes a frame and a plurality of buttons. The frame includes a top side and a bottom side opposite from the top side, and the frame defines a plurality of cells. Each cell has a cell wall and is configured to receive a medicament. Each button of the plurality of buttons is within a corresponding cell. Each button includes a center portion, a first hinge line adjacent to the cell wall, and a second hinge line between the first hinge line and the center portion.

According to some embodiments, a tray for a troche mold assembly includes a frame having a top side and a bottom side opposite from the top side, and the frame defines a plurality of cells. Each cell has a cell wall, and each cell is configured to receive a medicament. The tray also includes a plurality of buttons, where each button is within a corresponding cell and includes a center portion, a first hinge line adjacent to the cell wall, and a second hinge line between the first hinge line and the center portion.

According to various embodiments, a troche mold assembly includes a cover and a tray. The cover defines a receiving area, and the tray is removably positioned in the receiving area. The tray includes a frame and a plurality of buttons. The frame includes a top side and a bottom side opposite from the top side, and the frame defines a plurality of cells, where each cell has a cell wall and is configured to receive a medicament. Each button of the plurality of buttons is within a corresponding cell. Each button includes a button surface, and the button surface of each button includes at least one score fob extending in a transverse dimension along the button surface and such that a gap is defined between an end of the score rib and the cell wall.

According to certain embodiments, a troche mold assembly includes a cover and a tray. The cover includes a base, a first side wall extending from the base, a second side wall extending from the base opposite from the first side wall, and an end wall extending from the base and between the first side wall and the second side wall. An end of the first side wall opposite from the base includes a first flange extending partially over the base and towards the second side wall, and an end of the second side wall opposite from the base includes a second flange extending partially over the base and towards the first side wall and such that at least a portion of the base is not covered by the first flange or the second flange. The base, the first side wall, the second side wall, the first flange, the second flange, and the end wall define a receiving area. The tray is removably positioned in the receiving area and includes a plurality of cells, where each cell is configured to receive a medicament.

According to some embodiments, a troche mold assembly includes a cover and a tray. The cover includes a base, a first side wall extending from the base and having a first cover engagement feature, a second side wall extending from the base opposite from the first side wall and having a second cover engagement feature, and an end wall extending from the base and between the first side wall and the second side wall. The base, the first side wall, the second side wall, and the end wall define a receiving area, and the base, the first side wall, and the second side wall define a receiving slot providing access to the receiving area. In various examples, the first cover engagement feature and the second cover engagement feature are within the receiving area. The tray includes a frame having a plurality of cells, where each cell is configured to receive a medicament. The frame also includes a first tray engagement feature on a first side of the frame and a second tray engagement feature on a second side of the frame opposite from the first side. The tray is selectively slidable through the receiving slot such that the tray is removably positioned within the receiving area. The first tray engagement feature is engageable with the first cover engagement feature and the second tray engagement feature is engageable with the second cover engagement feature to selectively retain at least a portion of the tray within the receiving area.

According to certain embodiments, a troche mold assembly includes a cover and a tray. The cover includes a base, a first side wall extending from the base, a second side wall extending from the base opposite from the first side wall, and an end wall extending from the base and between the first side wall and the second side wall. The base, the first side wall, the second side wall, and the end wall define a receiving area. The cover also includes at least one locating rib extending from the base within the receiving area and between the first side wall and the second side wall. A height of the at least one locating rib is less than a height of the first side wall and less than a height of the second side wall. The tray includes a frame having a top side and a bottom side opposite from the top side, and the frame defines a plurality of cells, each of which is configured to receive a medicament. The tray is removably positioned within the receiving area such that the at least one locating rib contacts the top side of the frame and the top side of the frame is spaced apart from the base within the receiving area.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
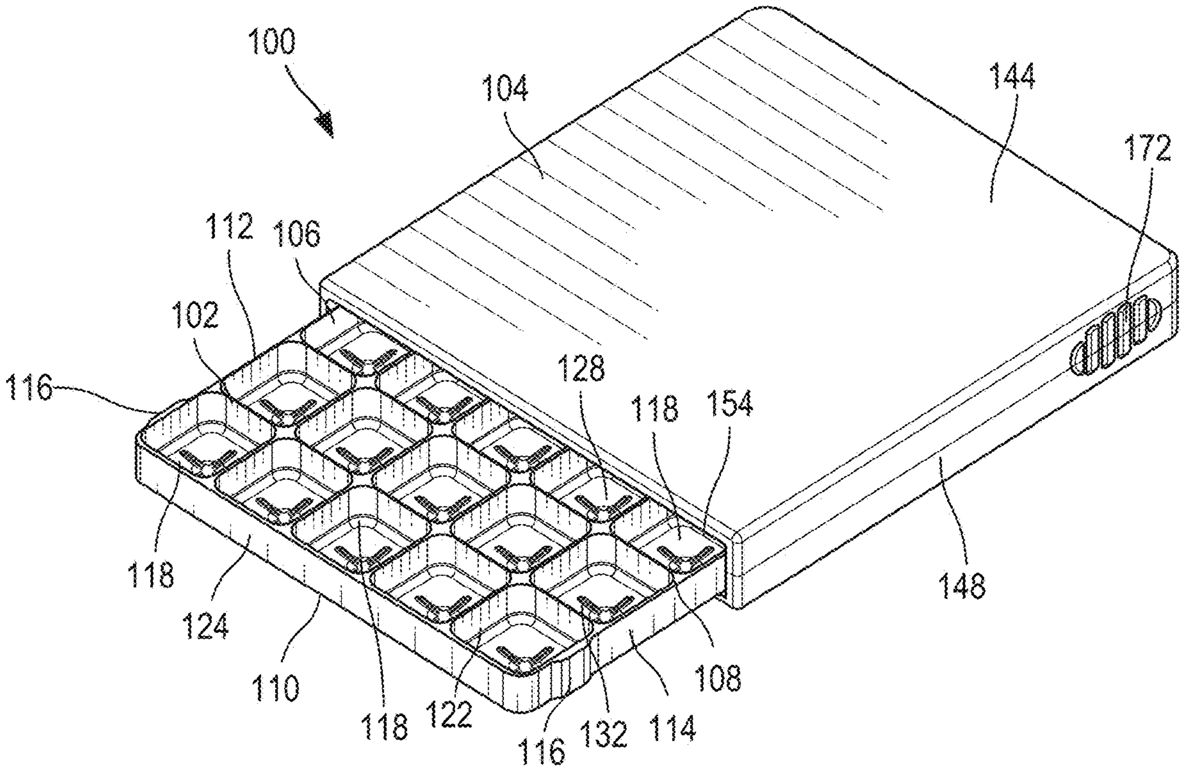
FIG. 1 is a top perspective view of a troche mold assembly having a tray and a cover according to embodiments.

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "longitudinal," "lateral," "vertical," "up," "down," "top," "bottom," "left" "right," "front," and "back," among others, are intended to refer to the orientation as illustrated and described in the figure (or figures) to which the components and directions are referencing.

Described herein are troche mold assemblies that can be, but do not have to be, a combination medication mold and dispenser that can be easily used in preparing troches and dispensing them to the patient. Troche medications are tablet-like lozenges that release medication as the tablet dissolves. In certain aspects, a troche mold assembly includes a tray and a cover. In various aspects, the tray may act as a mold for pharmacists to make medicated troches in, and may also act as a troche container for the patient. The cover may protect the troches in the tray. In some cases, the cover is slidable relative to the tray, although in other embodiments the cover may be movable in other orientations relative to the tray. A top surface of the cover may provide a location for a label. The troche mold assemblies described herein may have a number of advantages. In some cases, the troche mold assemblies described herein may allow for single-pour of the entire contents forming the troches, which may result in significant time-savings for pharmacists, technicians, or other personnel in filling prescriptions because each cell does not have to be individually filled. The tray may also include various features to facilitate fast and accurate filling of the cells of the tray. As some non-limiting examples, the tray may include one or more of fill-indicating ramps, graduation marks, dosage ribs, flexible buttons, text, combinations thereof, or other features described herein, to facilitate fast and accurate filling of the cells. In various aspects, the tray may form troches that provide smoother mouth-feel for the patient than afforded by traditional troches. As some non-limiting examples, the tray may form generally rectangular troches having rounded edges, hexagon-shaped troches, circular troches, pentagon-shaped troches, or various other shapes as desired. In some cases, one or more components of the troche mold assemblies may provide tactile and/or audible feedback during certain situations. As a non-limiting example, the engagement features on the cover and the tray may provide increased friction or resistance to movement in situations such as when the tray is fully inserted into the cover. As other non-limiting examples, activation of a child resistant feature, including but not limited to a child resistant latch and/or a child resistant locking feature, a pronounced "CLICK" may be heard and felt, signaling that the device is ready to dispense another dose.

In certain embodiments, the troche mold assemblies described herein may include ribs on the bottom of each cell to provide score marks on cured troches, which may allow for the patient to cut the troche into desired doses. In some embodiments, the tray is reversible and/or can be inserted into the cover in more than one orientation. A top surface of the tray may be substantially planar to allow for scraping with a spatula or other tool. Optionally, the top surface of the tray may be free of voids other than the cells to minimize residual or wasted troche material. The cover may include gripping areas and at least one cutout to facilitate movement of the tray relative to the cover. In certain embodiments, a bottom side of the cover is open to help orient the patient and prevent sliding the tray out upside down. In certain embodiments, the cover may include one or more locating ribs that locate the tray relative to the cover. In some cases, the locating ribs may provide vertical clearance between the top of the tray and the cover such that troche extending above the top of the tray can be accommodated. In various embodiments, buttons on the tray may have bimodal behavior to facilitate removal of a troche from a particular cell.

In some embodiments, troches produced by the troche mold assemblies described herein have an improved structure providing an improved user experience. In various examples, the improved structure allows for a troche to sit comfortably in a patient's mount while minimizing or eliminating points of discomfort when used. In some optional embodiments, a troche produced by a troche mold assembly described herein may have a rounded (or non-planar) top, a flat base, and smoothed (or non-angular) corners between intersecting sides (e.g., between the top and a side, between two sides, between a side and the base, etc.). In certain embodiments, the troche is configured to sit between the patient's gums and cheek, with the flat base positioned against the patient's gums. The aforementioned advantages are not considered limiting on the disclosure, and various other advantages or benefits may be realized with the troche mold assemblies described herein.

FIGS. 1-10 illustrate an example of a troche mold assembly 100 according to various embodiments. The troche mold assembly 100 includes a tray 102 and a cover 104.

The tray 102 includes a frame 106 having a top side 108 and a bottom side 110 opposite from the top side 108. In certain aspects, the frame 106 includes a front side 124, a back side 126, and a pair of longitudinal sides 112, 114; however, the particular shape of the frame 106 illustrated in FIGS. 1-10 should not be considered limiting on the current disclosure, and the frame 106 need not be rectangular, may not include all the sides 112, 114, 124, 126, and/or may include additional sides. In various aspects, the tray 102 is reversible such that either side 124, 126 could be the front side or the back side. In certain aspects, the top side 108 of the frame 106 is substantially planar such that a spatula or other appropriate tool may be moved across the top surface during a troche-forming process to remove any excess material forming the troches. Optionally, the top side 108 may be free of voids of cavities (other than cells, which are discussed in detail below) to minimize residual or wasted troche material on the tray 102.

Figure 2:
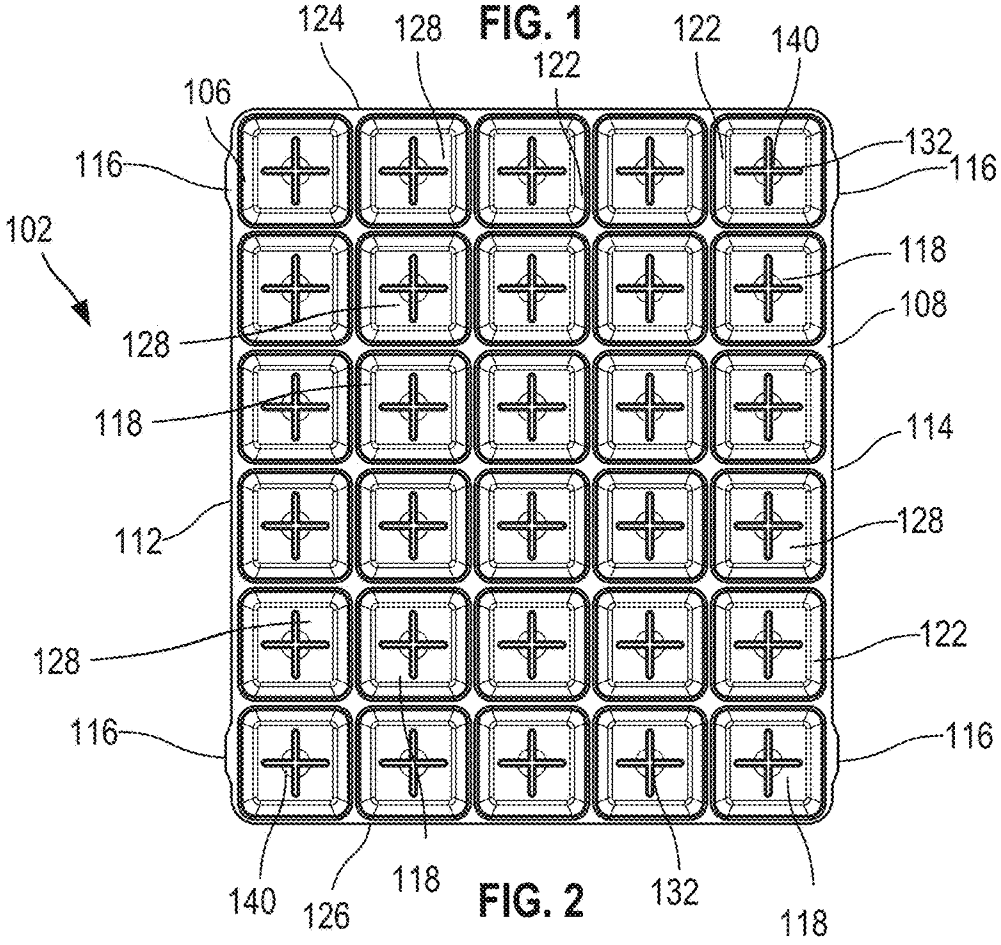
FIG. 2 is a top view of the tray of the troche mold assembly of FIG. 1.
Figure 3:
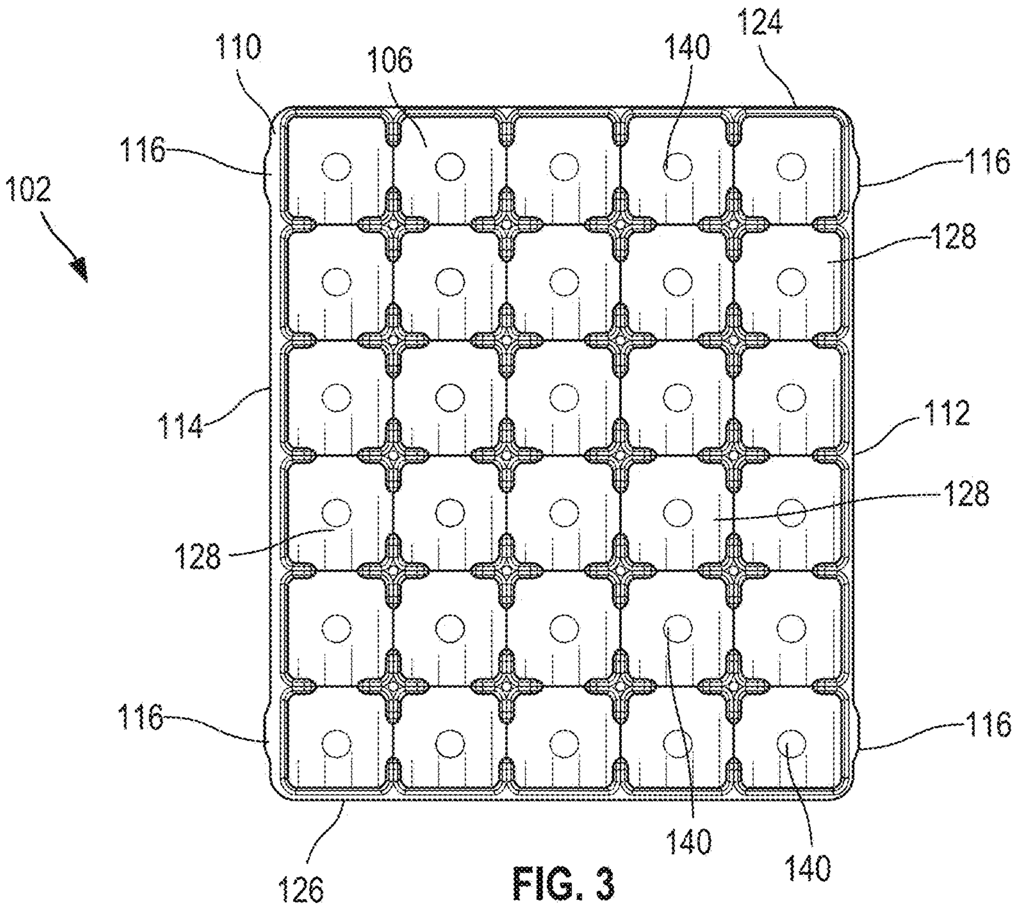
FIG. 3 is a bottom view of the tray of the troche mold assembly of FIG. 1.

As best illustrated in FIGS. 2 and 3, in certain embodiments, the frame 106 may optionally include one or more tray engagement features 116 that selectively engage cover engagement features (discussed in greater detail below). In the example of FIGS. 1-10, the tray 102 includes four tray engagement features 116, although any number of tray engagement features may be utilized. In the example of FIGS. 1-10, the tray engagement features 116 are tabs extending outwards from the sides 112, 114 in a lateral direction, although in other examples, various other suitable devices, components, or mechanisms may be utilized as the tray engagement features, and the tray engagement features need not extend in the lateral direction. Moreover, in other embodiments, a single side (e.g., side 112) may include one or more tray engagement features and/or the tray engagement features may be provided at various other locations on the frame 106 as desired.

Figure 14:
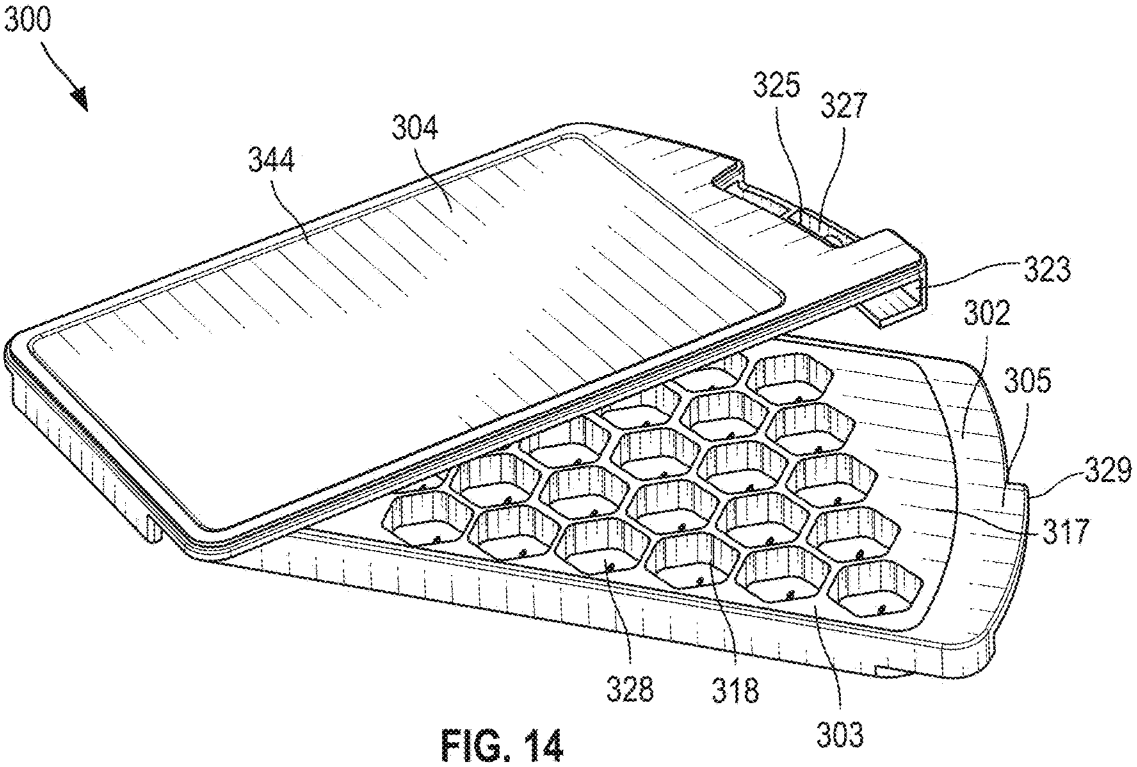
FIG. 14 is a perspective view of a troche mold assembly according to embodiments.
Figure 15:
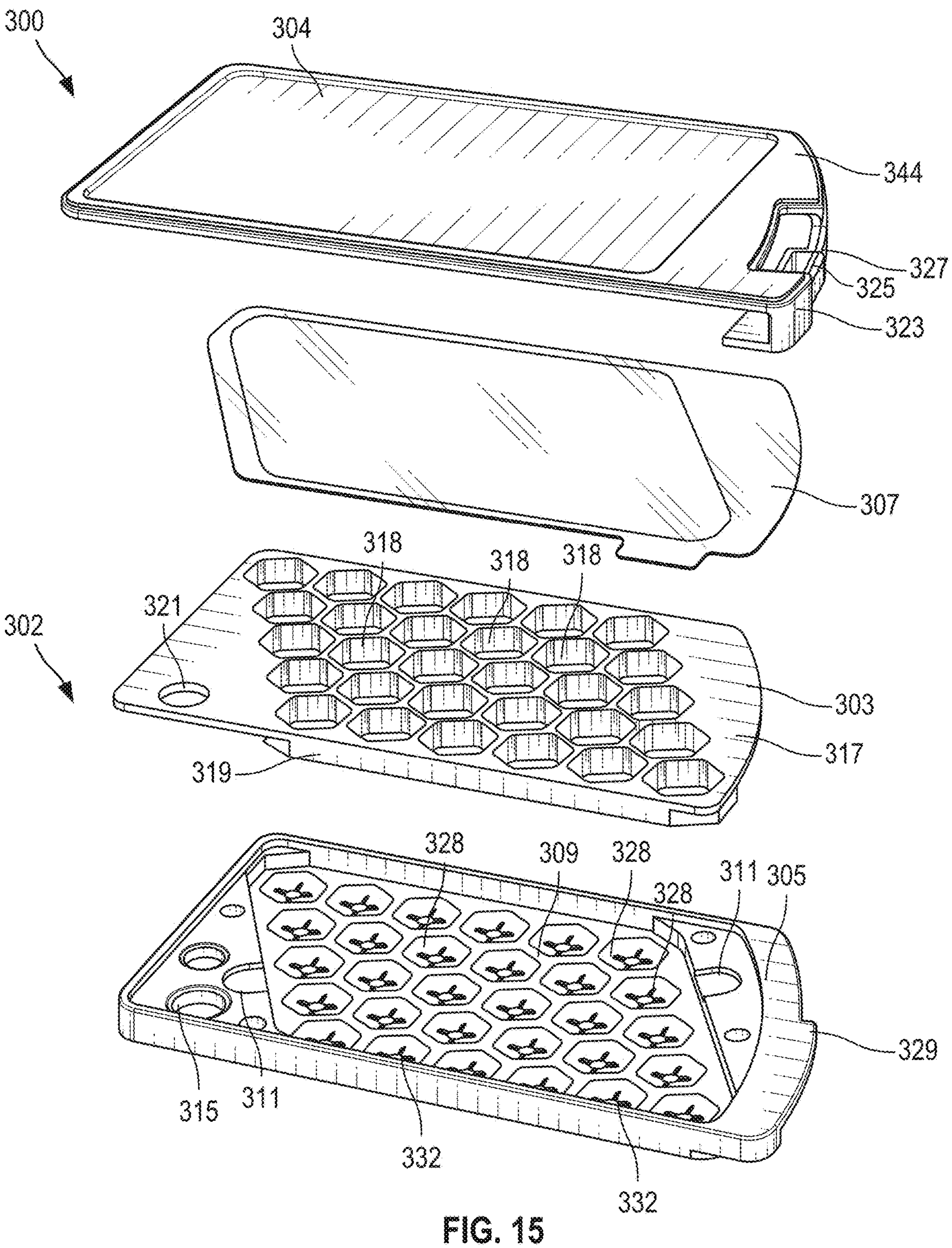
FIG. 15 is an exploded assembly view of the troche mold assembly of FIG. 14.

The frame 106 includes a plurality of cells 118. The shape, number, volume, and/or arrangement of the cells 118 should not be considered limiting on the current disclosure. In the example of FIGS. 1-10, the frame 106 includes thirty cells 118 provided in a 5×6 rectangular arrangement, and each cell 118 is generally rectangular. In other embodiments, the frame 106 may have more than thirty cell 118 or less than thirty cells 118, the cells 118 may be provided in other rectangular arrangements or other non-rectangular arrangements, and the cells 118 need not be rectangular and could be other shapes (e.g., triangular, hexagonal, circular, elliptical, pentagonal, etc.). As a non-limiting example, FIGS. 14 and 15 illustrate another troch mold assembly 300 having thirty of hexagonal-shaped cells 118 that are provided in a parallelogram arrangement. In certain examples, the cells 118 may be shaped to minimize sharp corners to provide a more comfortable troche to a patient. As one non-limiting example, in the example of FIGS. 1-10, each cell 118 has radiused corners 120. In other examples, other portions of the cell 118 may have smoothed portions to minimize sharp corners. As one non-limiting example, the intersection between a cell wall 122 and a button 128 may additionally or alternatively be smoothed or radiused. In various examples, each cell 118 has a predetermined volume. In one non-limiting example, the volume of a cell 118 may be about 0.5 mL to 1.5 mL such as about 0.9 mL. In other examples, the predetermined volume may be less than 0.5 mL, and/or greater than 1.5 mL. It will be appreciated that the shape, size, and/or volume of one cell 118 need not be the same as another cell 118.

Figure 4:
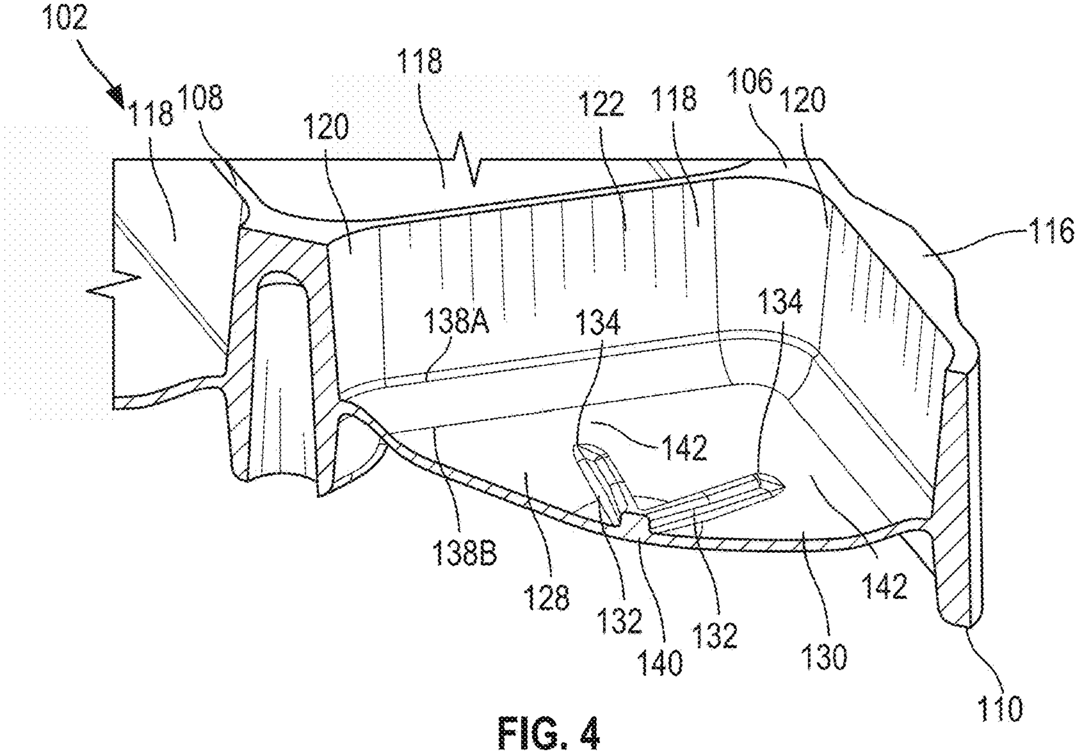
FIG. 4 illustrates a portion of the tray of the troche mold assembly of FIG. 1.
Figure 5:
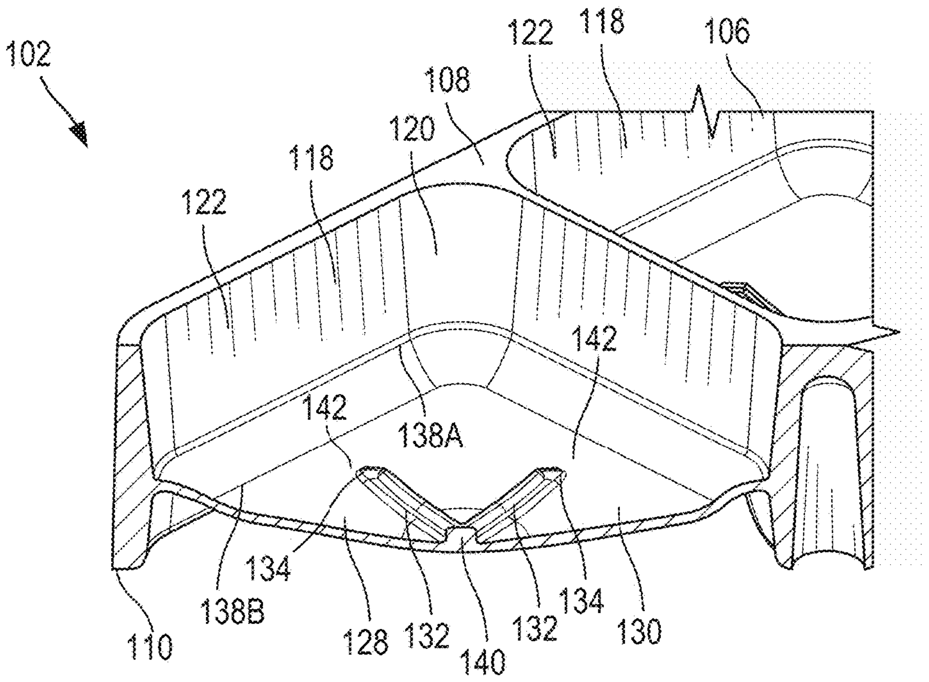
FIG. 5 illustrates another portion of the tray of the troche mold assembly of FIG. 1.

As best illustrated in FIGS. 4 and 5, each cell 118 has the cell wall 122. In certain examples, one or more cell walk 122 are tapered in a vertical direction. In certain embodiments, the tapered cell walls 122 may facilitate the ejection of a troche from a particular cell 118. In some cases, the draft of the cell walls 122 is optionally a non-zero angle relative to a vertical axis. In some cases, the non-zero angle is from to 3° to 8°, such as about 5°. However, in various other embodiments, the non-zero angle may be less than 3° or greater than 8°.

Within each cell 118, the tray 102 includes the button 128 having a button surface 130. In various aspects, the button 128 is flexible relative to the frame 106. In certain cases, the button 128 is movable relative to the frame 106 when a force is applied on a particular button from an unflexed position (illustrated in FIGS. 1-10) and a flexed position were the button surface 130 is moved closer to the top side 108 of the frame 106. In various embodiments, a patient may apply the force to move the button 128 from the unflexed position to the flexed position to eject the troche from the particular cell 118. In some cases, each button 128 is movable responsive to a force from about 2.5 lbf to about 5.5 lbf, although in other examples, each button 128 may be responsive to a force less than 2.5 lbf and/or greater than 5.5 lbf. In various aspects, the thickness of each button 128 is reduced compared to other portions of the frame 106 to facilitate movement of the button 128 (and thus ejection of individual troches), although it need not be reduced in other embodiments.

In certain embodiments, and as best illustrated in FIGS. 4 and 5, within each cell 118, the button 128 is provided between the top side 108 and the bottom side 110 (e.g., the button 128 is offset from the top side 108 and the bottom side 110). In various aspects, the offset button 128 may minimize accidental ejections of troches from a particular cell 118 when the tray 102 is placed on a surface (e.g., when a patient places the tray 102 on a table).

As best illustrated in FIGS. 4 and 5, the button surface 130 may be non-planar. In certain aspects, the non-planar button surface 130 may facilitate removal of a troche from a particular cell 118 and/or may facilitate movement of the button 128 relative to the frame 106. In other embodiments, the button surface 130 may optionally be planar. In various cases, during a process of making one or more troches, the button surface 130 is configured to form a top of a troche such that the top of the troche is rounded (or non-planar). In some cases, the button surface 130 may approximate an anthropometric curvature of a patient's cheek such that the top of the troche approximates the curvature of the patient's cheek. In other embodiments, the curvature of the button surface 130 may produce the troche having the top with minimal sharp edges or portions that may otherwise cause discomfort to a patient. In some embodiments, the button surface 130 optionally includes at least one score rib 132 extending along the button surface 130, and in some cases, the button surface 130 includes a plurality of score ribs 132. The score rib(s) 132 may be centered on a center portion 140 of the button 128, although they need not be centered in other examples. In the example of FIGS. 1-10, each button surface 130 includes two score ribs 132, and one score rib 132 extends substantially perpendicular to the other score rib 132. In other examples, any number of score ribs 132 may be provided and at various orientations relative to other score ribs 132. During a troche-forming process, the score rib(s) 132 may impart score lines on the molded troche, and the patient may utilize the score lines formed by the score rib(s) to form sub-doses of the troche. As best illustrated in FIGS. 4 and 5, ends 134 of each score rib 132 do not extend to the cell walls 122 and are spaced apart from the cell walls 122 by a gap 142. In various aspects, the ends 134 spaced apart from the cell wall 122 by the gap 142 may reduce the stiffness of the button 128 such that less force is required to eject a troche from the cell 118.

In various embodiments, each button 128 includes hinge lines 138. In certain aspects, each button 128 may include at least two hinge lines 138, although any number of hinge lines 138, including no hinge lines, may be provided. The hinge lines may facilitate movement of the button 128 relative to the frame 106. In some cases, the hinge lines 138 may optionally bias the button 128 towards the unflexed position, although they need not bias the button 128 in other embodiments. In certain embodiments, an outer hinge line 138A may be proximate to the cell wall 122, and an inner hinge line 138B may be between the outer hinge line 138A and the center portion 140 of the button 128. Each of the hinge lines 138A-B may form a closed perimeter, although they need not in other examples. As best illustrated in FIGS. 4 and 5, when both the hinge lines 138 and the score ribs 132 are provided, the ends 134 of the score rib 132 may be spaced apart from the inner hinge line 138B. In various aspects, the ends 134 spaced apart from the inner hinge line 138B may reduce the stiffness of the button 128 such that less force is required to eject a troche from the cell 118.

The cover 104 of the troche mold assembly 100 generally defines a receiving area 152 that the tray 102 may be selectively positioned within. The particular shape of the cover 104 and/or the receiving area 152 should not be considered limiting on the current disclosure. In some cases, and as discussed in greater detail below, the tray 102 may be slidable relative to the cover 104; however, in other embodiments, the tray 102 may be movable in other orientations relative to the cover 104. As one non-limiting example, the cover 104 may be rotatable or pivotable relative to the tray 102.

Figure 6:
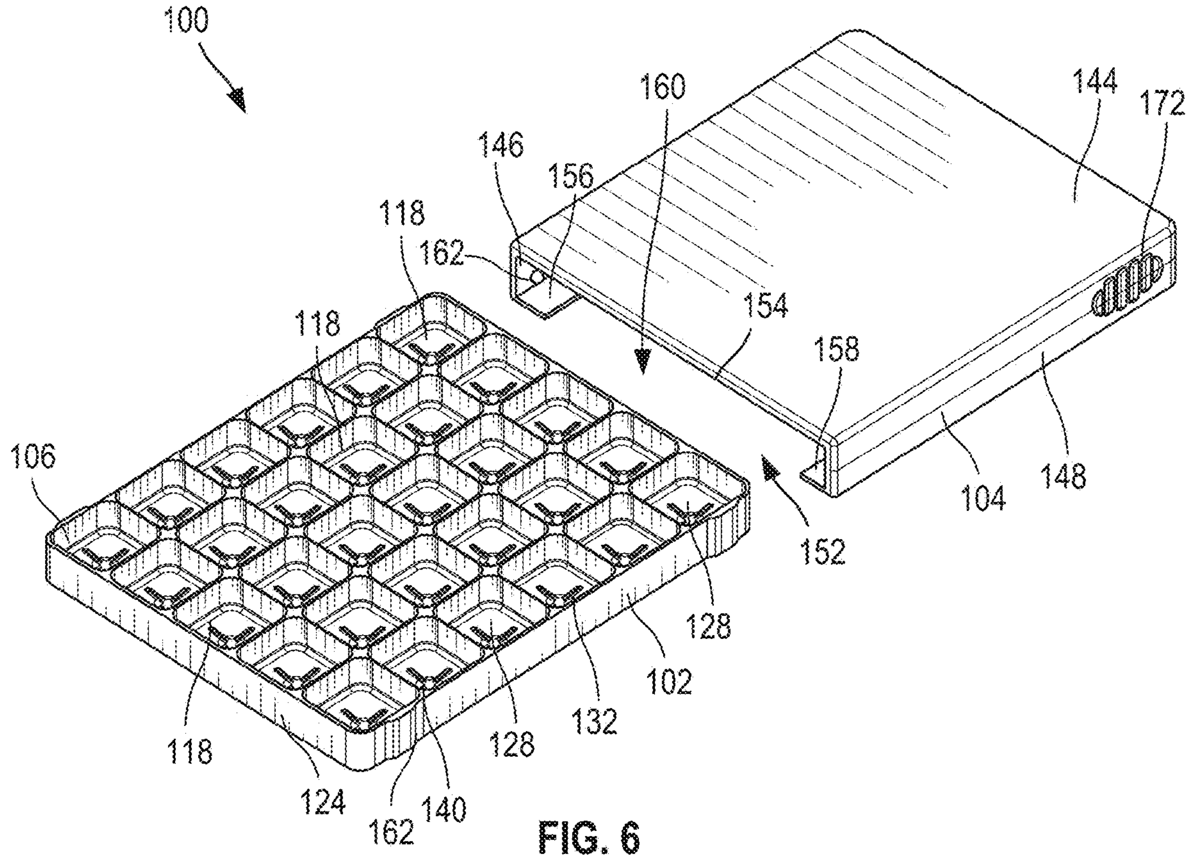
FIG. 6 is an exploded assembly view of the troche mold assembly of FIG. 1.
Figure 7:
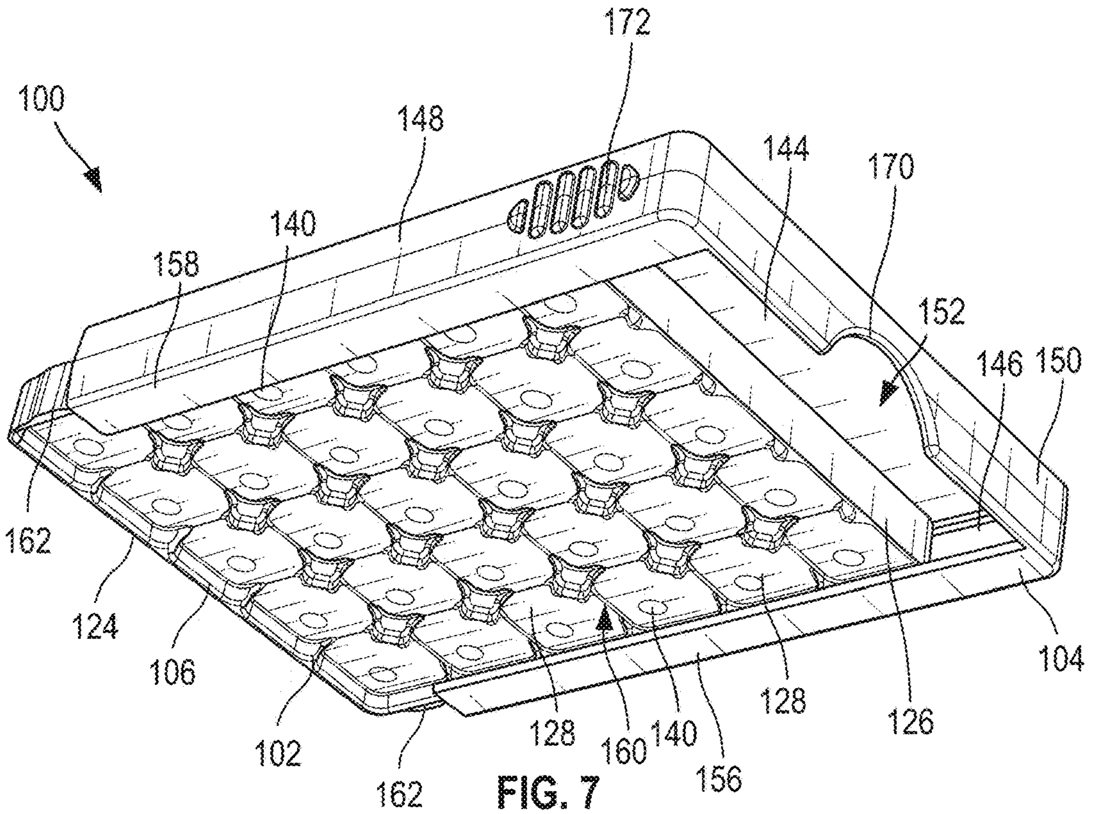
FIG. 7 is a bottom perspective view of the troche mold assembly of FIG. 1 with the tray partially removed from the cover.
Figure 8:
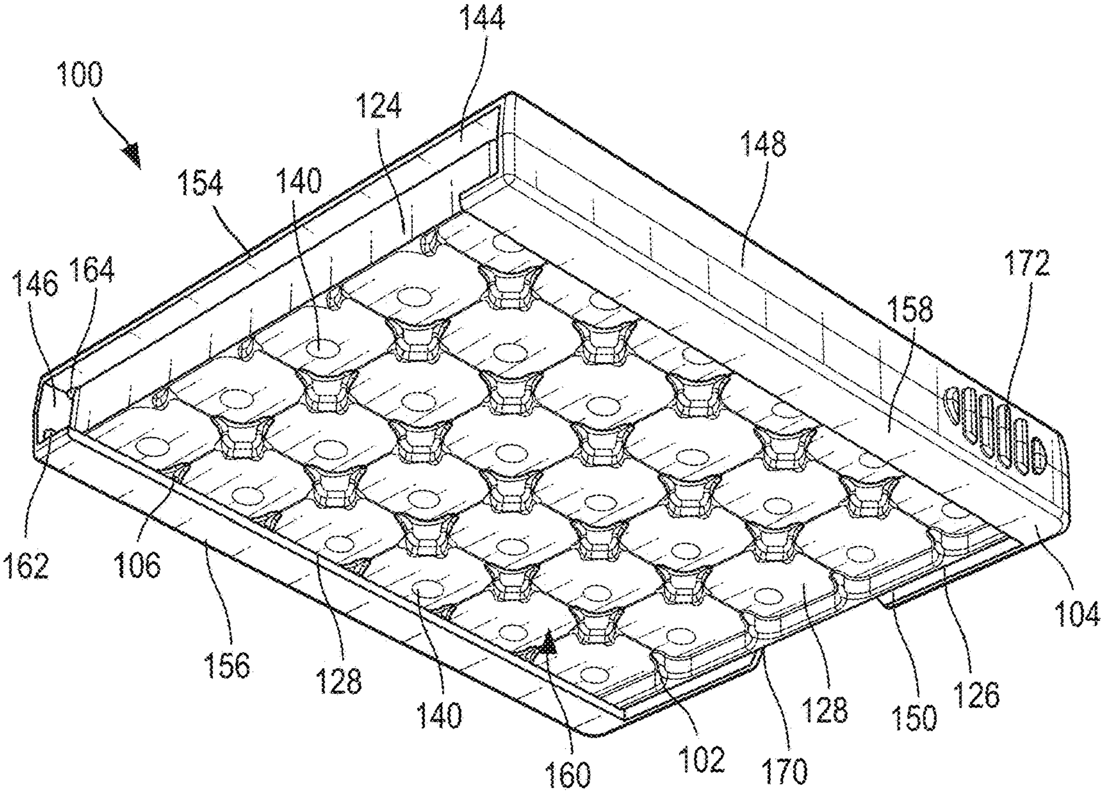
FIG. 8 is a bottom perspective view of the troche mold assembly of FIG. 1 with the tray fully inserted into the cover.

In certain embodiments, and as illustrated in FIGS. 1 and 6-10, the cover 104 includes a base 144, a first side wall 146 extending from the base 144, a second side wall 148 extending from the base 144 opposite from the first side wall 146, and an end wall 150 extending from the base 144 and between the first side wall 146 and the second side wall 148. The base 144, the first side wall 146, the second side wall 148, and the end wall 150 together may define the receiving area 152. In some cases, a label may be provided on a portion of the cover 104 (e.g., the base 144) that is outside of the receiving area 152. As best illustrated in FIGS. 6 and 8 the base 144, the first side wall 146, and the second side wall 148 may define a receiving slot 154 opposite from the end wall 150. The receiving slot 154 may provide access to the receiving area 152, and the tray 102 may be slidable through the receiving slot 154 and into the receiving area 152.

Optionally, and as best illustrated in 6-8, the first side wall 146 may include a first flange 156 opposite from the base 144, and the second side wall 148 may include a second flange 158 opposite from the base 144. The first flange 156 may extend partially over the base 144 and towards the second side wall 148, and the second flange may extend partially over the base 144 and towards the first side wall 146. When the flanges 156, 158 are included, the flanges 156, 158 may at least partially define the receiving area 152. As best illustrated in FIGS. 6 and 7, an opening 160 is defined between the first flange 156 and the second flange 158. As discussed in greater detail below, the opening 160 may provide partial access to the tray 102 when the tray 102 is positioned within the receiving area 152. In various embodiments, and as best illustrated in FIGS. 9 and 10, when the tray 102 is positioned within the receiving area 152, a first portion of the tray 102 is retained between the first flange 156 and the base 144, and a second portion of the tray 102 is retained between the second flange 158 and the base 144.

In some cases, and as best illustrated in FIGS. 7 and 8, an edge of the end wall opposite optionally includes a cutout 170. As explained in greater detail below, the cutout 170 may provide selective access to the tray 102 positioned in the receiving are 152 to facilitate removal of the tray 102 from the receiving area 152. As best illustrated in FIG. 7, a width of the cutout 170 is less than a distance between the first side wall and the second side wall.

In various cases, the cover 104 optionally includes gripping features 172 that a user may grip to facilitate movement of the cover 104 relative to the tray 102. In some cases, the gripping features 172 may be provided on the side walls 146, 148, although in other examples the gripping features 172 may be provided at various locations as desired. In the example of FIGS. 1-10, the gripping features 172 include gripping ribs, although in other examples, various other features or components may be utilized as gripping features.

Figure 9:
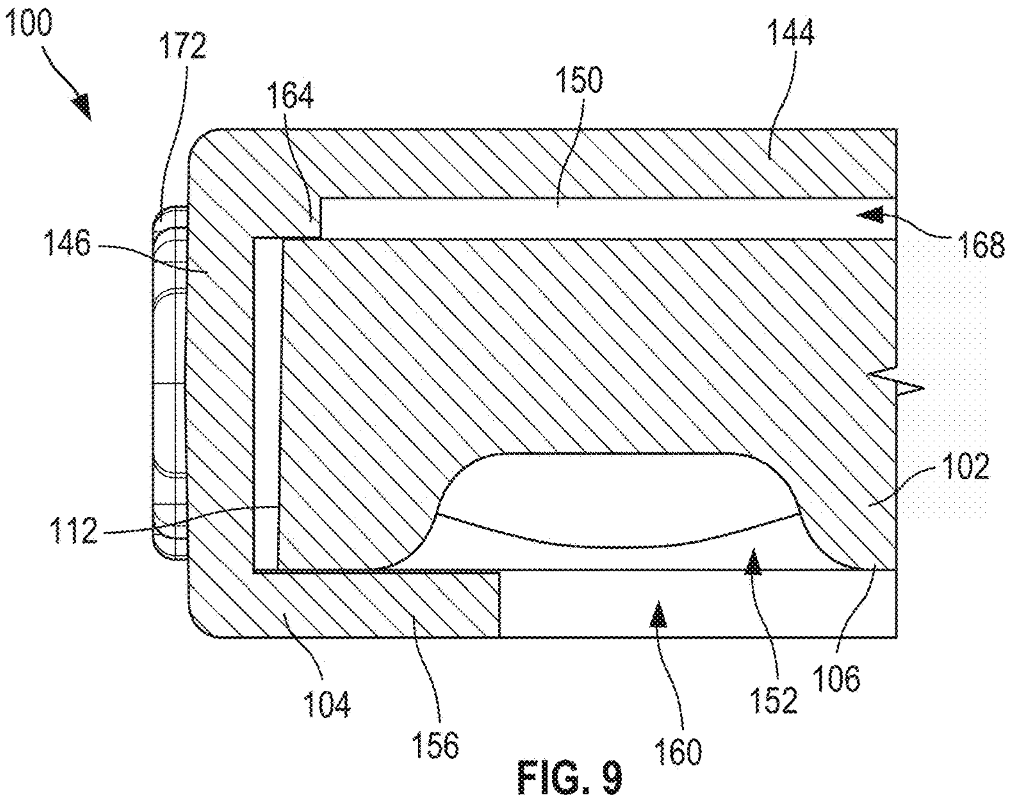
FIG. 9 is a sectional view of a portion of the tray assembled with the cover of the troche mold assembly of FIG. 1.
Figure 10:
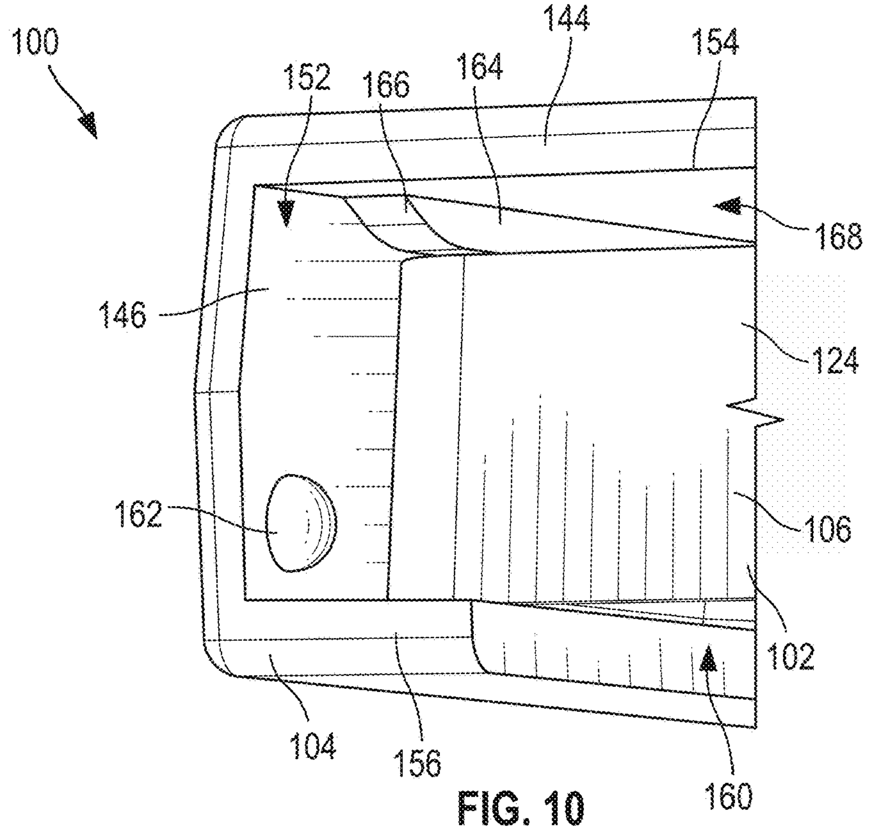
FIG. 10 is a perspective view of a portion of the tray assembled with the cover of the troche mold assembly of FIG. 1.

Optionally, and as best illustrated in FIGS. 6 and 9, the cover 104 may include one or more cover engagement features 162 that may selectively engage the corresponding tray engagement features 116 on the tray 102. In the example of FIGS. 1-10, the cover 104 includes two cover engagement features 162 where one cover engagement feature 162 is provided on the first side wall 146 proximate to the receiving slot 154 and another the cover engagement feature 162 is provided on the second side wall 148 proximate to the receiving slot 154. In these examples, the cover engagement features 162 are provided within the receiving area 152. In other examples, any number of engagement features 162 may be utilized at other locations on the side walls 146, 148 and/or at other locations on the cover 104 as desired. In the example of FIGS. 1-10, the cover engagement features 162 are ribs extending outwards from the side walls 146, 148; however, in other examples, the cover engagement features may be various suitable devices, mechanisms, or components suitable for selectively engaging the tray engagement features 116. In various examples, the cover engagement features 162 and/or the tray engagement features 116 may extend a predetermined distance such that the cover engagement features 162 and the tray engagement features 116 are engaged at predetermined events when the troche mold assembly 100 is being used. As one non-limiting example, the cover engagement features 162 and at least some of the tray engagement features 116 may be engaged (and thus provide increased friction between the cover 104 and the tray 102) during the beginning of travel when removing the tray 102 from the receiving area 152, may become disengaged for an intermediate length of travel, and may become re-engaged and provide a stop against further movement out of the receiving area 152 at the end of travel.

In various embodiments, and as best illustrated in FIGS. 8-10, the cover 104 includes one or more locating ribs 164 that extend from the base 144 within the receiving area 152. In the example of FIGS. 1-10, the cover 104 includes one locating rib 164 proximate to the first side wall 146 and another locating rib (not visible in the views of FIGS. 1-10) proximate to the second side wall 148. In other examples, the locating ribs 164 may be provided at other locations, additional locating ribs 164 may be utilized, or a single locating rib 164 may be utilized. As best illustrated in FIG. 9, a height of a locating rib 164, or a distance that the locating rib 164 extends from the base 144, is less than a height of the first side wall 146 (and less than a height of the second side wall 146). In certain cases, a leading portion 166 of the locating rib 164, or a portion of the locating rib 164 proximate to the receiving slot 154, has a varying height. As best illustrated in FIGS. 9 and 10, when the tray 102 is assembled with the cover 104, the locating rib 164 may contact the top side 108 of the frame 106 such that the top side 108 of the frame 106 is spaced apart from the base 144 by a clearance gap 168. In certain aspects, the clearance gap 168 may allow for the insertion of troches that are proud of the top side 108 when inserting the tray 102 into the cover 104. In various aspects, at least a portion of the tray 102 within the receiving area 152 is retained between the locating rib 164 and the first flange 156. In some cases, the leading portion 166 of the locating rib 164 may help guide and position the tray 102 within the receiving area 152.

In various examples, a method of forming troches with the troche mold assembly 100 may include providing an empty tray 102 on a work surface and providing the base material into the cells 118. The method may optionally include removing excess base material from the tray 102 by scraping a spatula or other appropriate tool across the top side 108 of the frame 106. Removing the excess base material may ensure or promote an even, flat surface for each troche. The method may include allowing the troches to set and solidify. In certain aspects, if any solidified troches have shrunk below flush with the top side 108, the method may include refilling the particular cells 118 with additional base material and removing excess base material.

In certain examples, after each cell 118 is filled completely and the troches have cured, the method may optionally include heating the top surface of each troche (e.g., with a heat gun or other suitable heat source) to reflow the top surface and provide a smooth, consistent surface finish. In various aspects, the method optionally includes providing a label on the cover 104. The method includes inserting the tray 102 into cover 104.

A troche formed by the method may have an improved structure with a flat base, a rounded (or non-planar) top opposite from the flat base, and smoothed corners at the intersection between adjacent sides or portions of the troche. As previously mentioned, the button surface may form the non-planar top of the troche. The improved structure of the troche allows the troche to sit comfortably in the patient's mouth while minimizing or preventing discomfort to the patient. In certain aspects, the troche is configured to sit between the patient's gums and cheek, with the flat base positioned against the patient's gums.

A method of using the troche mold assembly 100 by a patient may include removing the tray 102 from the cover 104. In certain aspects, removing the tray 102 may include grabbing the gripping features 172 and pulling the tray 102. In various aspects, removing the tray 102 may include pushing the tray 102 through the cutout 170.

With the appropriate cells 118 outside of the receiving area 152, the method includes applying a force upwards against the appropriate button 128 to eject a troche. Once the troche is ejected, the tray 102 may be slid back into the cover 104. In certain aspects, engagement between the cover engagement feature 162 and the tray engagement feature 116 may provide tactile and/or auditory feedback that the tray 102 is secured in the cover 104. Once all of the troches have been ejected from the tray 102, the tray 102 and the cover 104 may be discarded.

Figure 11:
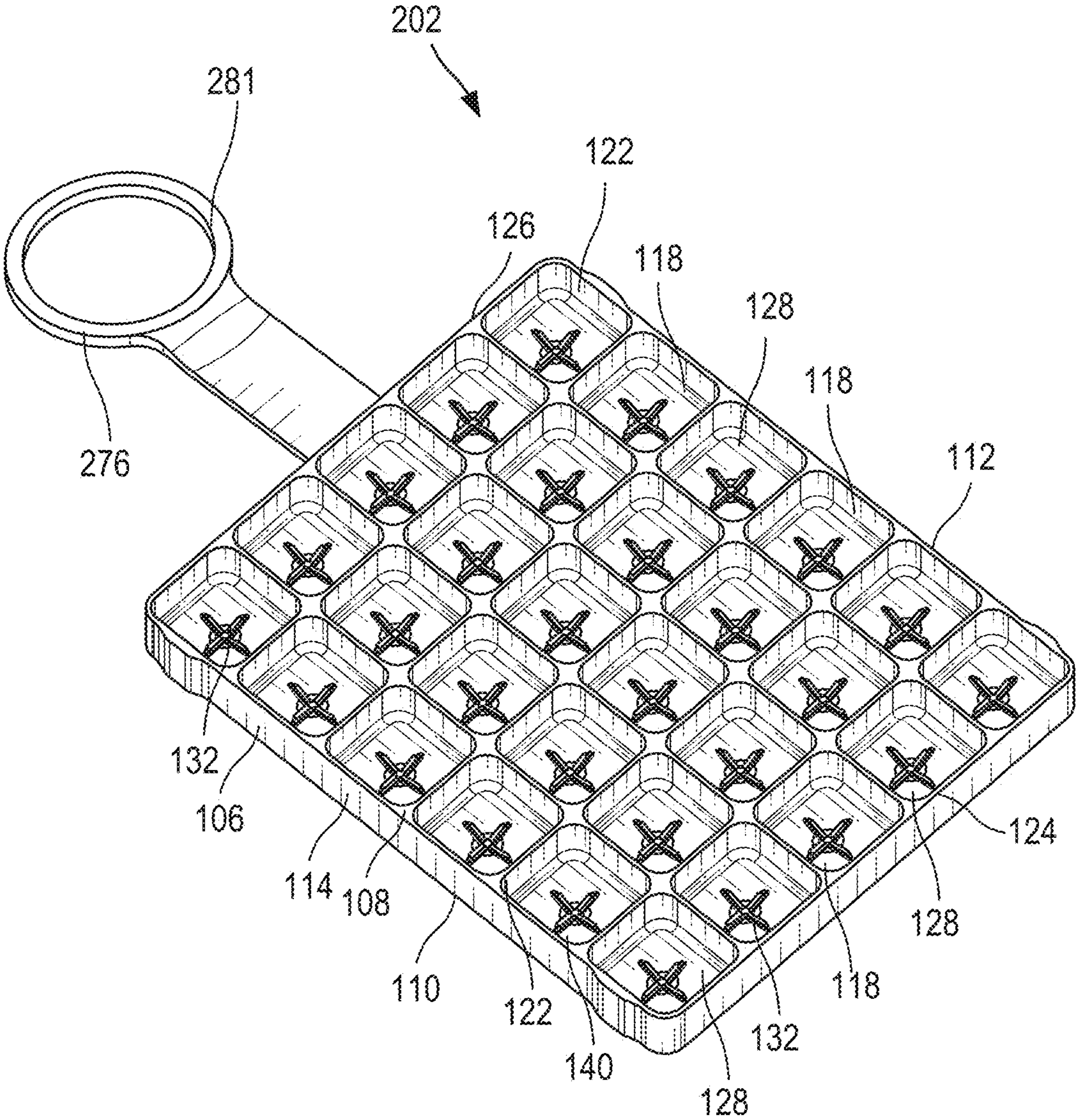
FIG. 11 is a perspective view of a tray of a troche mold assembly according to embodiments.
Figure 12:
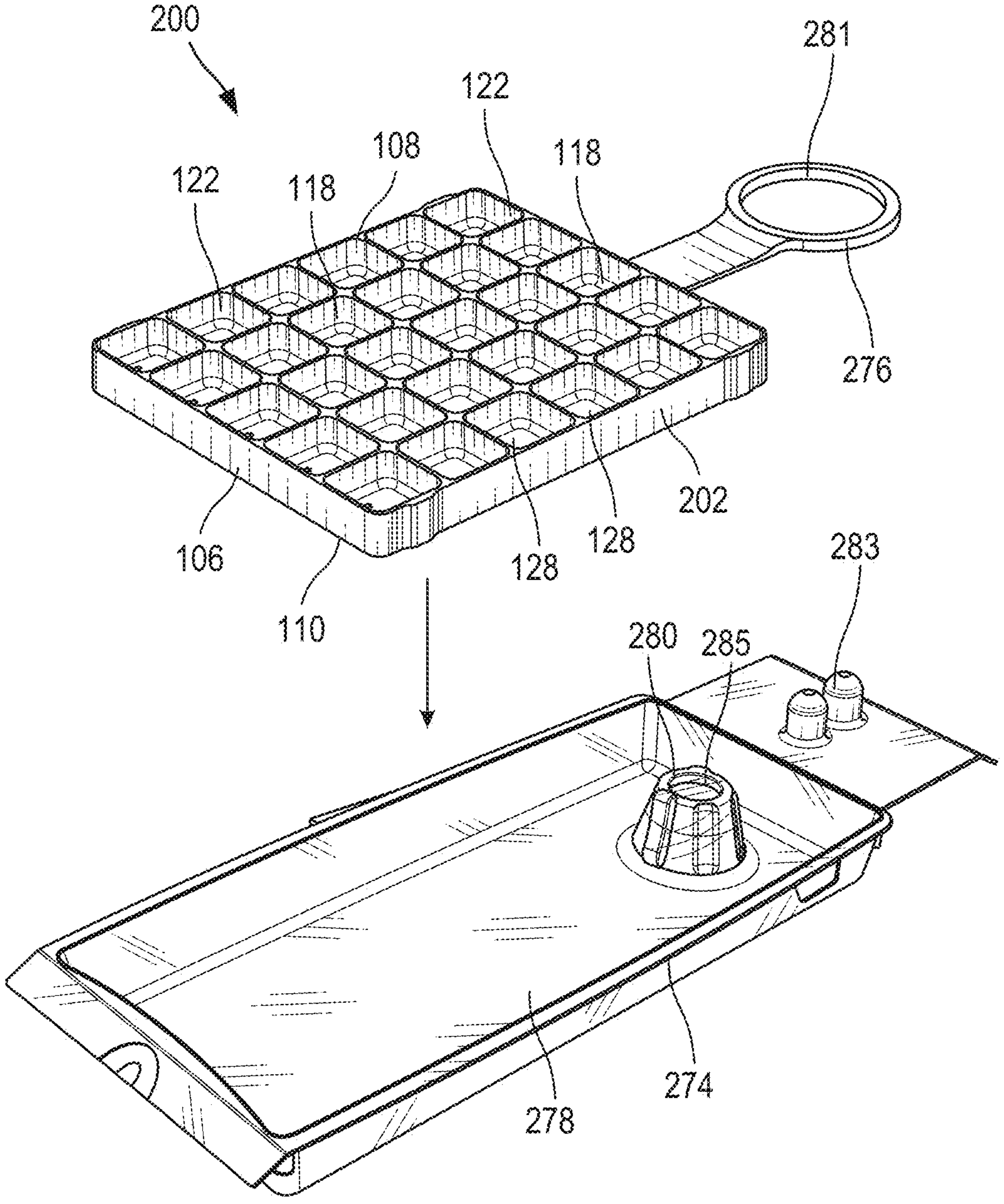
FIG. 12 is an exploded assembly view of the tray of FIG. 11 and a child resistant container according to embodiments.
Figure 13:
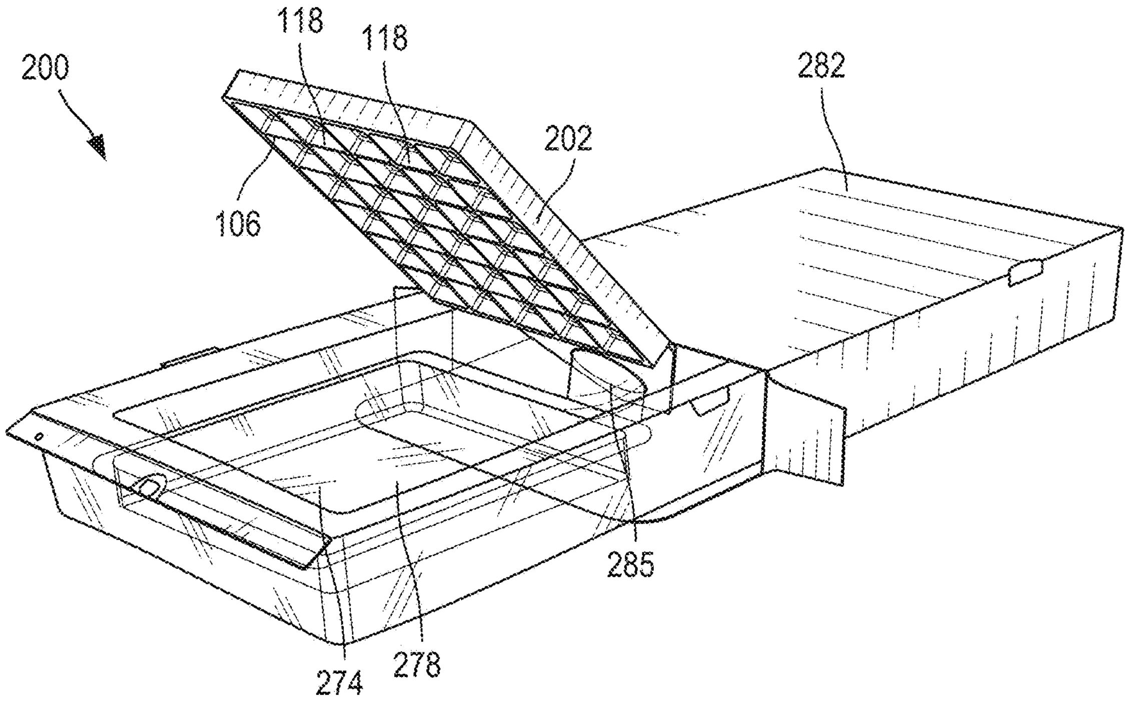
FIG. 13 is a perspective view of the assembled tray and child resistant container of FIG. 12.

FIGS. 11-13 illustrate another embodiment of a troche mold assembly 200. The troche mold assembly 200 is similar to the troche mold assembly 100 and includes a tray 202. However, unlike the troche mold assembly 100, the troche mold assembly 200 does not include a cover. Instead, the troche mold assembly 200 includes a support tray 274.

The tray 202 is substantially similar to the tray 102 except that the tray 202 additionally includes a child resistant locking feature 276 extending outwards from the frame 106. In the example illustrated, the child resistant locking feature 276 extends outwards from the back side 126 although in other examples the child resistant locking feature 276 may be provided at various other locations as desired. The support tray 274 defines a receiving area 278 that selectively receives the tray 202. As best illustrated in FIG. 12, the support tray 274 may include a complimentary locking feature 280 that selectively engages the child resistant locking feature to secure the tray 202 relative to the support tray 274. In the example illustrated, the child resistant locking feature 276 includes a locking ring 281, and the complimentary locking feature 280 includes a locking post 283 that is insertable through the locking ring 281 and engageable with a locking aperture 285 to secure the locking ring 281. The particular child resistant locking feature 276 and complimentary locking feature 280 illustrated should not be considered limiting on the current disclosure, and various other suitable locking features may be utilized to secure the tray 202 relative to the support tray 274 to provide a child resistant troche mold assembly 200. As illustrated in FIG. 13, the assembled tray 202 and support tray 274 may be retained within a container 282, and the engagement of the child resistant locking feature 276 with the complimentary locking feature 280 may prevent the tray 202 from being removed from the tray 274 and/or the container 282.

FIGS. 14 and 15 illustrate another troche mold assembly 300 according to various embodiments. The troche mold assembly 300 includes a cover 304 and a tray assembly 302. In various examples, the tray assembly 302 includes a grid 303 and a tray 305. Optionally, the troche mold assembly includes an intermediate cover 307, which may be a film, foil, or other suitable device as described in detail below.

The tray 305 includes a main chamber 309 with a volume that accommodates material fill for the troches while also accounting for grid displacement of the material. The tray 305 may have various suitable shapes as desired. The main chamber 309 may also be designed for a certain amount of material fill overage (e.g., 3-5% overage, although it could be less or more than 3-5%). The main chamber 309 may include one or more buttons 328 defined in the surface of the main chamber 309. Similar to the buttons 128, the buttons 328 may have various suitable geometries to facilitate ejection of individual troches. As some non-limiting examples, and similar to the buttons 128, the buttons 328 may be hexagonal, rectangular, circular, or have other geometries or shapes as desired. As such, the shape of the buttons 328 should not be considered limiting on the current disclosure. Similarly, the number and arrangement of the buttons 328 within the main chamber 309 should not be considered limiting on the current disclosure. Each button 328 is associated with a corresponding cell 318 of the grid 303. In various aspects, the thickness of each button 328 is reduced compared to other portions of the main chamber 309 to facilitate ejection of individual troches (e.g., the buttons 328 may be more flexible compared to other portions of the main chamber 309. Optionally, one or more of the buttons 328 may include score ribs 332 to facilitate dividing each troche into a sub-dosage. The score ribs 332 may be substantially similar to the score ribs 132. In one non-limiting example, four score ribs are 332 provided to facilitate dividing one troche into ¼ sub-dosages; however, in other examples, any number of score ribs 332 in any suitable arrangement may be provided for dividing one troche into a sub-dosage.

The tray 305 may also optionally include one or more fill-indicator ramps 311 that provide a visual indication as material approaches a "full-pool" condition. Optionally, the tray 305 may include graduation marks and/or text to facilitate fast and accurate filling of the material into the main chamber 309. The tray 305 may include one or more securing features 315 for selective engagement of the grid 303 and/or the cover 304 to the tray 305. Any suitable securing features 315 may be utilized. In the embodiment illustrated in FIGS. 14 and 15, the securing features 315 are apertures that receive split pins on the cover 304 and grid 303, respectively. In some cases, the securing features 315 may allow for movement (e.g., pivoting, rotation, etc.) of the cover 304 while it is secured to the tray 305.

The grid 303 includes a mounting surface 317 and a body 319 that defines at least one cell 318. Similar to the cells 118, the number, shape, or configuration of the cells 318 defined by the grid 303 should not be considered limiting on the disclosure. In the example of FIGS. 14 and 15, the grid 303 defines thirty cells 318. The body 319 defining the cells 318 projects below the mounting surface 317, and the body 319 is positionable within the main chamber 309 of the tray 305. In various examples, the amount of material forming the body 319 is controlled to displace the material filled into the main chamber 309 of the tray 305 by a predetermined amount. In some cases, the body 319 is controlled such that the material is displaced into the cells 318 and the material optionally forms a meniscus on the mounting surface 317 (or is filled to various other predefined levels as desired). Similar to the cells 118, each cell 318 may be drafted to facilitate ejection of troches from each cell 318. Securing features 321 (e.g., split pins or other securing features) that are configured to cooperate with the securing features 315 of the tray 305 may optionally project below the mounting surface 317.

Optionally, the intermediate cover 307 may be provided over the cells 318 of the grid 303. The intermediate cover 307 may be a film, foil, adhesive layer, or other suitable material. When included, the intermediate cover 307 may protect the troches in the cells 318 from contamination and/or prevent or reduce material migration (leakage) in the event of re-flow of the troche material (e.g., caused by elevated temperatures).

The cover 304 includes a body 344 and optionally includes a side ledge 323. Optionally, a securing feature (not visible in figures shown) configured to engage the securing feature 315 of the tray 305 may project below the body 344. In certain examples, the side ledge 323 limits movement of the cover 304 relative to the tray 305. The cover 304 may provide physical protection and contamination protection to the troches. Optionally, the cover 304 is movable relative to the tray 305 such that individual rows of cells 318 are exposed as the cover 304 rotates.

The troche mold assembly 300 may optionally include a locking feature 325, which may be any suitable feature for inhibiting or restricting access to the contents of the troche mold assembly 300 (e.g., by a child). In some cases, the locking feature 325 includes a wall 327 on the tray and a plectrum feature 329 on the cover 304. In various aspects, the locking feature 325 provides tactile and/or audible feedback when the locking feature 325 is moved from a locked position to an unlocked position (or vice versa).

A method of using the troche mold assembly 300 may optionally include a pharmacist, technician, or other suitable person preparing a custom prescription of a troche base and active ingredient separately. The pharmacist places the tray 305 on a flat surface. The pharmacist pours the troche base and active ingredient into the main chamber 309 of the tray 305, and optionally continues to fill the main chamber 309 until the troche base and active ingredient begin to spill over into the fill-indicator ramps 311. Once the fill-indicator ramps 311 are full, the troche mold assembly 300 is ready to receive the grid 303. The pharmacist places the grid 303 into place over the filled tray 305, optionally by aligning securing features of the grid 303 with securing features of the tray 305 and the body 344 with the main chamber 309. The pharmacist locks the grid 303 into place over the filled tray 305, which causes the troche base and active ingredient level to rise and automatically fill each cell 318 of the grid 303 to full capacity (or as otherwise desired). Optionally (e.g., due to slight over-fill) the pharmacist may trowel the mounting surface 317 of the grid 303 to ensure even filling of the cells of the grid 303. The troche base and active ingredient is allowed to cool and solidify. Optionally, the intermediate cover 307 is attached over the solidified troches to protect them from contamination and/or prevent or reduce material migration in the event of reflow. The cover 304 is secured into place over the filled grid 303, and the pharmacists rotates the cover 304 into place to engage the locking feature. Optionally, an indicator (e.g., prescription label) is attached to the cover 304.

In other embodiments, the shape of the main chamber, the arrangement of the cells defined by the grid, and the attachment location of the cover to the tray may be varied as desired. In some embodiments, the grid has a rectangular shape, and the cells of the grid may have a rectangular shape. In other examples, the grid may include a locating rib on at least one side of the grid that is positionable within a locating groove on the tray to facilitate positioning of the grid relative to the tray. In some examples, the main chamber of the tray also includes flex corners that add to flexibility of tray and may facilitate insertion or removal of the grid. Optionally, open areas are defined between the sides of the grid and the main chamber to help retain the grid. In other embodiments, an external perimeter of the grid may be omitted (i.e., the grid is an "open" grid), and the tray and grid have a rectangular shape. In various other examples, different types of locking features and different pivot locations for the cover may be utilized. In certain embodiments, a troche mold assembly includes a tray, a liner, a grid, an optional intermediate cover, and the cover. In such examples, the liner may positionable within the main chamber of the tray, and the grid is positionable within the liner. In certain aspects, the grid may be a closed grid, and the grid may snap over the edge of the tray to secure the grid relative to the tray.

In other examples, a troche mold assembly may filled in a vertical orientation compared to the troche mold assembly of FIGS. 14 and 15. An optional method of casting a troche using a vertical troche mold includes holding the troche mold vertically. Optionally, casting includes squeezing the troche mold slightly to force a thin lid to open up. Casting may include pouring the hot troche base into the device (optionally using a rough fill line as a guide). The device may be placed upright in a vice and left to cure. Optionally, to remove the troches, the thin lid is cut off and the troches are ejected. In some cases, vertical casting may remove the spatula-type action traditionally needed for the pharmacist because casting includes the steps of pour, clamp, and end up with a nice surface finish.

In certain other examples, a troche mold assembly may be a ring-shaped troche mold that includes a tray, grid, and cover. In various examples, the cover is rotatable relative to the tray such that one cell/troche is exposed at a predefined position. Optionally, a pusher or blade may be included to facilitate removal of individual troches. Optionally, a fill plate is included with the troche mold. The fill plate may optionally include at least one plug positioned within a cell of the grid.

Figure 16:
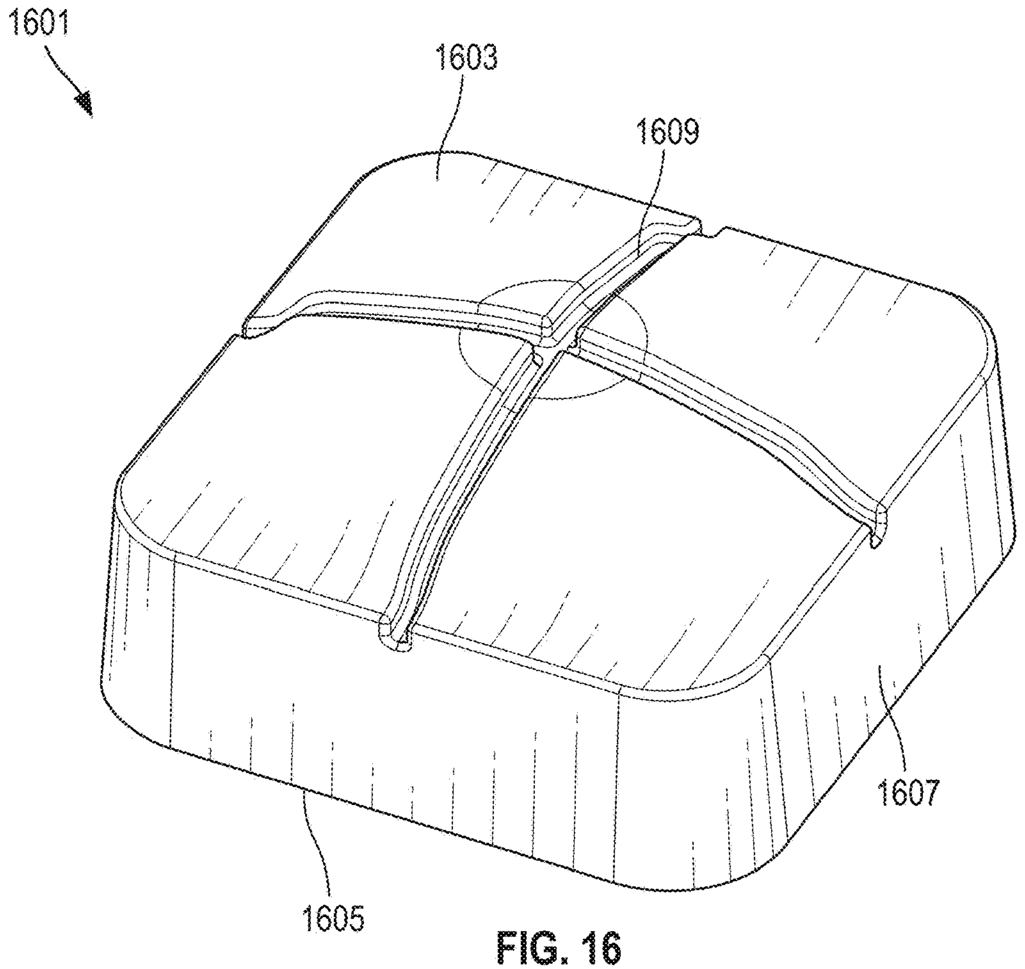
FIG. 16 is a perspective view of a troche according to embodiments.
Figure 17:
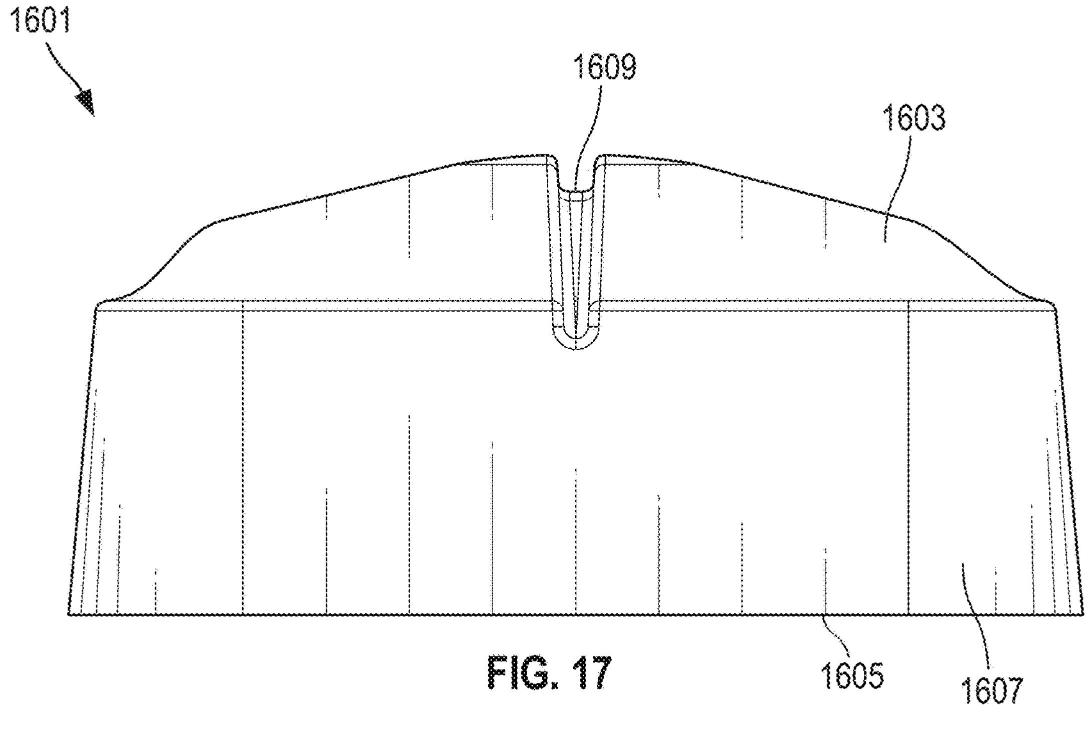
FIG. 17 is a side view of the troche of FIG. 16.

FIGS. 16 and 17 illustrate an example of a troche 1601 according to various embodiments. The troche 1601 may be formed by any of the troche mold assemblies described herein, including but not limited to the troch mold assembly 100. As illustrated, the troche 1601 may include a top 1603, a base 1605 opposite from the top 1603, and a side 1607 extending between the top 1603 and the base 1605. As best illustrated in FIG. 17, the top 1603 may be rounded or otherwise non-planar, and the base 1605 may be substantially flat or planar. In other examples, the top 1603 and/or the base 1605 may have various other profiles or shapes as desired. Grooves 1609 may be defined in the top 1603 (via the score rib(s) 132). The shape, number, or pattern of the grooves 1609 should not be considered limiting. As best illustrated in FIG. 17, in certain cases, the intersection of the side 1607 with the top 1603 (and optionally the intersection of the side 160 with the base 1605) may be rounded, although in other examples, the intersection may have various other features to minimize or eliminate potential points of discomfort for a user. In some cases, as best illustrated in FIG. 17, the side 1607 may be tapered such that a dimension of the side 1607 proximate to the top 1603 is different from the dimension of the side 1607 proximate to the base 1605. In other examples, the side 1607 may have various other profiles between the top 1603 and the base 1605 as desired. While the side 1607 is illustrated as having a generally rectangular shape, in other examples, the side 1607 may form various other shapes as desired. When used, the troche 1601 is configured to sit between the patient's gums and cheek, with the base 1605 positioned against the patient's gums and the non-planar top 1603 against the patient's cheek.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A troche mold assembly comprising: a cover defining a receiving area; and a tray removably positioned in the receiving area, the tray comprising: a frame comprising a top side and a bottom side opposite from the top side, wherein the frame defines a plurality of cells, and wherein each cell is configured to receive a medicament; and a plurality of buttons, wherein each button is within a corresponding cell, and wherein each button is within the corresponding cell between the top side and the bottom side of the frame.

Illustration 2. The troche mold assembly of any preceding or subsequent illustrations or combination of illustrations, wherein each button comprises a center portion, a first hinge line adjacent to the cell wall, and a second hinge line between the first hinge line and the center portion.

Illustration 3. The troche mold assembly of any preceding or subsequent illustrations or combination of illustrations, wherein the first hinge line and the second hinge line each define a closed perimeter.

Illustration 4. The troche mold assembly of any preceding or subsequent illustrations or combination of illustrations, wherein each cell comprises a cell wall, and wherein the cell wall is drafted at a non-zero angle relative to a vertical axis of the frame.

Illustration 5. The troche mold assembly of any preceding or subsequent illustrations or combination of illustrations, wherein the angle is from 3° to 8°.

Illustration 6. The troche mold assembly of any preceding or subsequent illustrations or combination of illustrations, wherein each cell comprises a cell wall, wherein each button comprises a button surface, and wherein the button surface of each button comprises a score rib extending in a transverse dimension along the button surface and such that a gap is defined between an end of the score rib and the cell wall.

Illustration 7. The troche mold assembly of any preceding or subsequent illustrations or combination of illustrations, wherein the score rib is a first score rib, and wherein the button surface of each button comprises a second score rib extending perpendicular to the first score rib across the button surface and such that a gap is defined between an end of the second score rib and the cell wall.

Illustration 8. The troche mold assembly of any preceding or subsequent illustrations or combination of illustrations, wherein each button comprises a center portion, a first hinge line adjacent to the cell wall, and a second hinge line between the first hinge line and the center portion, and wherein a portion of the first hinge line and a portion of the second hinge line are between the end of the score rib and the cell wall.

Illustration 9. The troche mold assembly of any preceding or subsequent illustrations or combination of illustrations, wherein each button is flexible relative to the frame.

Illustration 10. The troche mold assembly of any preceding or subsequent illustrations or combination of illustrations, wherein the cover comprises: a base; a first side wall extending from the base; a second side wall extending from the base opposite from the first side wall; and an end wall extending from the base and between the first side wall and the second side wall, wherein the base, the first side wall, the second side wall, and the end wall define the receiving area.

Illustration 11. The troche mold assembly of any preceding or subsequent illustrations or combination of illustrations, wherein: an end of the first side wall opposite from the base comprises a first flange extending partially over the base and towards the second side wall; an end of the second side wall opposite from the base comprises a second flange extending partially over the base and towards the first side wall and such that at least a portion of the base is not covered by the first flange or the second flange; and the first flange and the second flange partially define the receiving area.

Illustration 12. The troche mold of any preceding or subsequent illustrations or combination of illustrations, wherein an end of the base opposite from the end wall, an end of the first side wall opposite from the end wall, and an end of the second side wall opposite from the end wall define a receiving slot providing access to the receiving area, and wherein the tray is slidable through the receiving slot.

Illustration 13. The troche mold assembly of any preceding or subsequent illustrations or combination of illustrations, wherein: the first side wall of the cover comprises a first cover engagement feature within the receiving area; the second side wall of the cover comprises a second cover engagement feature within the receiving area; the tray further comprises a first tray engagement feature on a first side of the frame and a second tray engagement feature on a second side of the frame opposite from the first side; and the first tray engagement feature is engageable with the first cover engagement feature and the second tray engagement feature is engageable with the second cover engagement feature to selectively retain at least a portion of the tray within the receiving area.

Illustration 14. The troche mold assembly of any preceding or subsequent illustrations or combination of illustrations, wherein: the cover further comprises a locating rib extending from the base within the receiving area and between the first side wall and the second side wall; a height of the locating rib is less than a height of the first side wall and less than a height of the second side wall; and the tray is removably positioned within the receiving area such that the locating rib contacts the top side of the frame and the top side of the frame is spaced apart from the base within the receiving area.

Illustration 15. The troche mold assembly of any preceding or subsequent illustrations or combination of illustrations, wherein the locating rib is a first locating rib; and wherein the cover further comprises a second locating rib extending from the base within the receiving area and between the first locating rib and the second side wall.

Illustration 16. The troche mold assembly of any preceding or subsequent illustrations or combination of illustrations, wherein the locating rib comprises a leading feature proximate to a receiving slot of the cover providing access to the receiving area, wherein the leading feature comprises a varying height.

Illustration 17. The troche mold assembly of any preceding or subsequent illustrations or combination of illustrations; wherein an edge of the end wall opposite from the base comprises a cutout, and wherein a width of the cutout is less than a distance between the first side wall and the second side wall.

Illustration 18. The troche mold assembly of any preceding or subsequent illustrations or combination of illustrations, wherein the first side wall comprises a first gripping portion and wherein the second side wall comprises a second gripping portion.

Illustration 19. The troche mold assembly of any preceding or subsequent illustrations or combination a illustrations, wherein the first gripping portion and the second gripping portion each comprise a plurality of gripping ribs.

Illustration 20. The troche mold assembly of any preceding or subsequent illustrations or combination of illustrations, wherein the top side of the frame is planar.

Illustration 21. A tray for a troche mold assembly, the tray comprising: a frame comprising a top side and a bottom side opposite from the top side, wherein the frame defines a plurality of cells, and wherein each cell is configured to receive a medicament; and a plurality of buttons, wherein each button is within a corresponding cell, and wherein each button is within the corresponding cell between the top side and the bottom side of the frame.

Illustration 22. The tray of any preceding or subsequent illustrations or combination of illustrations, further comprising a child resistant locking feature extending outwards from the frame and configured to engage a corresponding child resistant locking feature of a support tray.

Illustration 21. A troche mold assembly comprising: a cover defining a receiving area; and a tray removably positioned in the receiving area, the tray comprising: a frame comprising a top side and a bottom side opposite from the top side, wherein the frame defines a plurality of cells, wherein each cell comprises a cell wall, and wherein each cell is configured to receive a medicament; and a plurality of buttons, wherein each button is within a corresponding cell, and wherein each button comprises a center portion, a first hinge line adjacent to the cell wall, and a second hinge line between the first hinge line and the center portion.

Illustration 24. The troche mold assembly of any preceding or subsequent illustrations or combination of illustrations, wherein each button is within the corresponding cell between the top side and the bottom side of the frame.

Illustration 25. The troche mold assembly of any preceding or subsequent illustrations or combinations of illustrations, wherein the first hinge line and the second hinge line each define a closed perimeter.

Illustration 26. The troche mold assembly of any preceding or subsequent illustrations or combination of illustrations, wherein the cell wall is drafted at a non-zero angle relative to a vertical axis of the frame.

Illustration 27. The troche mold assembly of any preceding or subsequent illustrations or combination of illustrations, wherein the angle is from 3° to 8°.

Illustration 28. The troche mold assembly of any preceding or subsequent illustrations or combination of illustrations, wherein each button comprises a button surface, and wherein the button surface of each button comprises a score rib extending in a transverse dimension along the button surface and such that a gap is defined between an end of the score fib and the cell wall.

Illustration 29. The troche mold assembly of any preceding or subsequent illustrations or combination of illustrations, wherein the score rib is a first score rib, and wherein the button surface of each button comprises a second score rib extending perpendicular to the first score rib across the button surface and such that a gap is defined between an end of the second score rib and the cell wall.

Illustration 30. The troche mold assembly of any preceding or subsequent illustrations or combination of illustrations, wherein each button further comprises a first hinge line adjacent to the cell wall and a second hinge line between the first hinge line and the center portion, and wherein a portion of the first hinge line and a portion of the second hinge line are between the end of the score rib and the cell wall.

Illustration 31. The troche mold assembly of any preceding or subsequent illustrations or combination of illustrations, wherein each button is flexible relative to the frame.

Illustration 32. The troche mold assembly of any preceding or subsequent illustrations or combination of illustrations, wherein the cover comprises: a base; a first side wall extending from the base; a second side wall extending from the base opposite from the first side wall; and an end wall extending from the base and between the first side wall and the second side wall, wherein the base, the first side wall, the second side wall, and the end wall define the receiving area.

Illustration 33. The troche mold assembly of any preceding or subsequent illustrations or combination of illustrations, wherein: an end of the first side wall opposite from the base comprises a first flange extending partially over the base and towards the second side wall; an end of the second side wall opposite from the base comprises a second flange extending partially over the base and towards the first side wall and such that at least a portion of the base is not covered by the first flange or the second flange; and the first flange and the second flange partially define the receiving area.

Illustration 34. The troche mold of any preceding or subsequent illustrations or combination of illustrations, wherein an end of the base opposite from the end wall, an end of the first side wall opposite from the end wall, and an end of the second side wall opposite from the end wall define a receiving slot providing access to the receiving area, and wherein the tray is slidable through the receiving slot.

Illustration 35. The troche mold assembly of any preceding or subsequent illustrations or combination of illustrations, wherein: the first side wall of the cover comprises a first cover engagement feature within the receiving area; the second side wall of the cover comprises a second cover engagement feature within the receiving area; the tray further comprises a first tray engagement feature on a first side of the frame and a second tray engagement feature on a second side of the frame opposite from the first side; and the first tray engagement feature is engageable with the first cover engagement feature and the second tray engagement feature is engageable with the second cover engagement feature to selectively retain at least a portion of the tray within the receiving area.

Illustration 36. The troche mold assembly of any preceding or subsequent illustrations or combination of illustrations, wherein: the cover further comprises a locating rib extending from the base within the receiving area and between the first side wall and the second side wall; a height of the locating rib is less than a height of the first side wall and less than a height of the second side wall; and the tray is removably positioned within the receiving area such that the locating rib contacts the top side of the frame and the top side of the frame is spaced apart from the base within the receiving area.

Illustration 37. The troche mold assembly of any preceding or subsequent illustrations or combination of illustrations, wherein the locating rib is a first locating rib, and wherein the cover further comprises a second locating rib extending from the base within the receiving area and between the first locating rib and the second side wall.

Illustration 38. The troche mold assembly of any preceding or subsequent illustrations or combination of illustrations, wherein the locating rib comprises a leading feature proximate to a receiving slot of the cover providing access to the receiving area, wherein the leading feature comprises a varying height.

Illustration 39. The troche mold assembly of any preceding or subsequent illustrations or combination of illustrations, wherein an edge of the end wall opposite from the base comprises a cutout, and wherein a width of the cutout is less than a distance between the first side wall and the second side wall.

Illustration 40. The troche mold assembly of any preceding or subsequent illustrations or combination of illustrations, wherein the first side wall comprises a first gripping portion and wherein the second side wall comprises a second gripping portion.

Illustration 41. The troche mold assembly of any preceding or subsequent illustrations or combination of illustrations, wherein the first gripping portion and the second gripping portion each comprise a plurality of gripping ribs.

Illustration 42. The troche mold assembly of any preceding or subsequent illustrations or combination of illustrations, wherein the top side of the frame is planar.

Illustration 43. A tray for a troche mold assembly, the tray comprising: a frame comprising a top side and a bottom side opposite from the top side, wherein the frame defines a plurality of cells, wherein each cell comprises a cell wall, and wherein each cell is configured to receive a medicament; and a plurality of buttons, wherein each button is within a corresponding cell, and wherein each button comprises a center portion, a first hinge line adjacent to the cell wall, and a second hinge line between the first hinge line and the center portion.

Illustration 44. The tray of any preceding or subsequent illustrations or combination of illustrations, further comprising a child resistant locking feature extending outwards from the frame and configured to engage a corresponding child resistant locking feature of a support tray.

Illustration 45. A troche mold assembly comprising: a cover defining a receiving area; and a tray removably positioned in the receiving area, the tray comprising: a frame comprising a top side and a bottom side opposite from the top side, wherein the frame defines a plurality of cells, wherein each cell comprises a cell wall, and wherein each cell is configured to receive a medicament; and a plurality of buttons, wherein each button is within a corresponding cell, wherein each button comprises a button surface, and wherein the button surface of each button comprises at least one score rib extending in a transverse dimension along the button surface and such that a gap is defined between an end of the score rib and the cell wall.

Illustration 46. The troche mold assembly of any preceding or subsequent illustrations or combination of illustrations, wherein each button is within the corresponding cell between the top side and the bottom side of the frame.

Illustration 47. The troche mold assembly of any preceding or subsequent illustrations or combination of illustrations, wherein each button comprises a center portion, a first hinge line adjacent to the cell wall, and a second hinge line between the first hinge line and the center portion.

Illustration 48. The troche mold assembly of any preceding or subsequent illustrations or combination of illustrations, wherein the first hinge line and the second hinge line each define a closed perimeter.

Illustration 49. The troche mold assembly of any preceding or subsequent illustrations or combination of illustrations, wherein the cell wall is drafted at a non-zero angle relative to a vertical axis of the frame.

Illustration 50. The troche mold assembly of any preceding or subsequent illustrations or combination of illustrations, wherein the angle is from 3° to 8°.

Illustration 51. The troche mold assembly of any preceding or subsequent illustrations or combination of illustrations, wherein the score rib is a first score rib, and wherein the button surface of each button comprises a second score rib extending perpendicular to the first score rib across the button surface and such that a gap is defined between an end of the second score rib and the cell wall.

Illustration 52. The troche mold assembly of any preceding or subsequent illustrations or combination of illustrations, wherein each button is flexible relative to the frame.

Illustration 53. The troche mold assembly of any preceding or subsequent illustrations or combination of illustrations, wherein the cover comprises: a base; a first side wall extending from the base; a second side wall extending from the base opposite from the first side wall; and an end wall extending from the base and between the first side wall and the second side wall, wherein the base, the first side wall, the second side wall, and the end wall define the receiving area.

Illustration 54. The troche mold assembly of any preceding or subsequent illustrations or combination of illustrations wherein: an end of the first side wall opposite from the base comprises a first flange extending partially over the base and towards the second side wall; an end of the second side wall opposite from the base comprises a second flange extending partially over the base and towards the first side wall and such that at least a portion of the base is not covered by the first flange or the second flange; and the first flange and the second flange partially define the receiving area.

Illustration 55. The troche mold of any preceding or subsequent illustrations or combination of illustrations, wherein an end of the base opposite from the end wall, an end of the first side wall opposite from the end wall, and an end of the second side wall opposite from the end wall define a receiving slot providing access to the receiving area, and wherein the tray is slidable through the receiving slot.

Illustration 56. The troche mold assembly of any preceding or subsequent illustrations or combination of illustrations, wherein: the first side wall of the cover comprises a first cover engagement feature within the receiving area; the second side wall of the cover comprises a second cover engagement feature within the receiving area; the tray further comprises a first tray engagement feature on a first side of the frame and a second tray engagement feature on a second side of the frame opposite from the first side; and the first tray engagement feature is engageable with the first cover engagement feature and the second tray engagement feature is engageable with the second cover engagement feature to selectively retain at least a portion of the tray within the receiving area.

Illustration 57. The troche mold assembly of any preceding or subsequent illustrations or combination of illustrations, wherein: the cover further comprises a locating rib extending from the base within the receiving area and between the first side wall and the second side wall; a height of the locating rib is less than a height of the first side wall and less than a height of the second side wall; and the tray is removably positioned within the receiving area such that the locating rib contacts the top side of the frame and the top side of the frame is spaced apart from the base within the receiving area.

Illustration 58. The troche mold assembly of any preceding or subsequent illustrations or combination of illustrations, wherein the locating rib is a first locating rib, and wherein the cover further comprises a second locating rib extending from the base within the receiving area and between the first locating rib and the second side wall.

Illustration 59. The troche mold assembly of any preceding or subsequent illustrations or combination of illustrations, wherein the locating rib comprises a leading feature proximate to a receiving slot of the cover providing access to the receiving area, wherein the leading feature comprises a varying height.

Illustration 60. The troche mold assembly of any preceding or subsequent illustrations or combination of illustrations, wherein an edge of the end wall opposite from the base comprises a cutout, and wherein a width of the cutout is less than a distance between the first side wall and the second side wall.

Illustration 61. The troche mold assembly of any preceding or subsequent illustrations or combination of illustrations, wherein the first side wall comprises a first gripping portion and wherein the second side wall comprises a second gripping portion.

Illustration 62. The troche mold assembly of any preceding or subsequent illustrations or combination of illustrations, wherein the first gripping portion and the second gripping portion each comprise a plurality of gripping ribs.

Illustration 63. The troche mold assembly of any preceding or subsequent illustrations or combination of illustrations, wherein the top side of the frame is planar.

Illustration 64. A troche mold assembly comprising: a cover comprising: a base; a first side wall extending from the base; a second side wall extending from the base opposite from the first side wall; and an end wall extending from the base and between the first side wall and the second side wall, wherein an end of the first side wall opposite from the base comprises a first flange extending partially over the base and towards the second side wall, wherein an end of the second side wall opposite from the base comprises a second flange extending partially over the base and towards the first side wall and such that at least a portion of the base is not covered by the first flange or the second flange, and wherein the base, the first side wall, the second side wall, the first flange, the second flange, and the end wall define a receiving area; and a tray removably positioned in the receiving area and comprising a plurality of cells, wherein each cell is configured to receive a medicament.

Illustration 65. The troch assembly of any preceding or subsequent illustrations or combination of illustrations, wherein the tray further comprises a frame comprising a top side and a bottom side, and wherein each button is within the corresponding cell between the top side and the bottom side of the frame.

Illustration 66. The troche mold assembly of any preceding or subsequent illustrations or combination of illustrations, wherein each button comprises a center portion, a first hinge line adjacent to the cell wall, and a second hinge line between the first hinge line and the center portion.

Illustration 67. The troche mold assembly of any preceding or subsequent illustrations or combination of illustrations, wherein the first hinge line and the second hinge line each define a closed perimeter.

Illustration 68. The troche mold assembly of any preceding or subsequent illustrations or combination of illustrations, wherein each cell comprises a cell wall, and wherein the cell wall is drafted at a non-zero angle relative to a vertical axis of the frame.

Illustration 69. The troche mold assembly of any preceding or subsequent illustrations or combination of illustrations, wherein the angle is from 3° to 8°.

Illustration 70. The troche mold assembly of any preceding or subsequent illustrations or combination of illustrations, wherein each cell comprises a cell wall, wherein each button comprises a button surface, and wherein the button surface of each button comprises a score rib extending in a transverse dimension along the button surface and such that a gap is defined between an end of the score rib and the cell wall.

Illustration 71. The troche mold assembly of any preceding or subsequent illustrations or combination of illustrations, wherein the score rib is a first score rib, and wherein the button surface of each button comprises a second score rib extending perpendicular to the first score rib across the button surface and such that a gap is defined between an end of the second score rib and the cell wall.

Illustration 72. The troche mold assembly of any preceding or subsequent illustrations or combination of illustrations, wherein each button comprises a center portion, a first hinge line adjacent to the cell wall, and a second hinge line between the first hinge line and the center portion, and wherein a portion of the first hinge line and a portion of the second hinge line are between the end of the score rib and the cell wall.

Illustration 71. The troche mold assembly of any preceding or subsequent illustrations or combination of illustrations, wherein each button is flexible relative to the frame.

Illustration 74. The troche mold of any preceding or subsequent illustrations or combination of illustrations, wherein an end of the base opposite from the end wall, an end of the first side wall opposite from the end wall, and an end of the second side wall opposite from the end wall define a receiving slot providing access to the receiving area, and wherein the tray is slidable through the receiving slot.

Illustration 75. The troche mold assembly of any preceding or subsequent illustrations or combination a illustrations, wherein: the first side wall of the cover comprises a first cover engagement feature within the receiving area; the second side wall of the cover comprises a second cover engagement feature within the receiving area; the tray further comprises a frame, a first tray engagement feature on a first side of the frame, and a second tray engagement feature on a second side of the frame opposite from the first side; and the first tray engagement feature is engageable with the first cover engagement feature and the second tray engagement feature is engageable with the second cover engagement feature to selectively retain at least a portion of the tray within the receiving area.

Illustration 76. The troche mold assembly of any preceding or subsequent illustrations of combination of illustrations, wherein: the cover further comprises a locating rib extending from the base within the receiving area and between the first side wall and the second side wall; a height of the locating rib is less than a height of the first side wall and less than a height of the second side wall; and the tray is removably positioned within the receiving area such that the locating rib contacts the top side of the frame and the top side of the frame is spaced apart from the base within the receiving area.

Illustration 77. The troche mold assembly of any preceding or subsequent illustrations or combination of illustrations, wherein the locating rib is a first locating rib, and wherein the cover further comprises a second locating rib extending from the base within the receiving area and between the first locating rib and the second side wall.

Illustration 78. The troche mold assembly of any preceding or subsequent illustrations or combination of illustrations, wherein the locating rib comprises a leading feature proximate to a receiving slot of the cover providing access to the receiving area, wherein the leading feature comprises a varying height.

Illustration 79. The troche mold assembly v, wherein an edge of the end wall opposite from the base comprises a cutout, and wherein a width of the cutout is less than a distance between the first side wall and the second side wall.

Illustration 80. The troche mold assembly of any preceding or subsequent illustrations or combination of illustrations, wherein the first side wall comprises a first gripping portion and wherein the second side wall comprises a second gripping portion.

Illustration 81. The troche mold assembly of any preceding or subsequent illustrations or combination of illustrations, wherein the first gripping portion and the second gripping portion each comprise a plurality of gripping ribs.

Illustration 82. A troche mold assembly comprising: a cover comprising: a base; a first side wall extending from the base and comprising a first cover engagement feature; a second side wall extending from the base opposite from the first side wall and comprising a second cover engagement feature; and an end wall extending from the base and between the first side wall and the second side wall, wherein the base, the first side wall, the second side wall, and the end wall define a receiving area, wherein the base, the first side wall, and the second side wall define a receiving slot providing access to the receiving area, and wherein the first cover engagement feature and the second cover engagement feature are within the receiving area; and a tray comprising a frame comprising: a plurality of cells, wherein each cell is configured to receive a medicament a first tray engagement feature on a first side of the frame; and a second tray engagement feature on a second side of the frame opposite from the first side, wherein the tray is selectively slidable through the receiving slot such that the tray is removably positioned within the receiving area; and wherein the first tray engagement feature is engageable with the first cover engagement feature and the second tray engagement feature is engageable with the second cover engagement feature to selectively retain at least a portion of the tray within the receiving area.

Illustration 83. A troche mold assembly comprising: a cover comprising: a base; a first side wall extending from the base; a second side wall extending from the base opposite from the first side wall; an end wall extending from the base and between the first side wall and the second side wall, wherein the base, the first side wall, the second side wall, and the end wall define a receiving area; and at least one locating rib extending from the base within the receiving area and between the first side wall and the second side wall, wherein a height of the at least one locating rib is less than a height of the first side wall and less than a height of the second side wall; and a tray comprising a frame, the frame comprising a top side and a bottom side opposite from the top side, wherein the frame defines a plurality of cells, and wherein each cell is configured to receive a medicament, wherein the tray is removably positioned within the receiving area such that the at least one locating rib contacts the top side of the frame and the top side of the frame is spaced apart from the base within the receiving area.

Illustration 84. The troche mold assembly of any preceding or subsequent illustrations or combination of illustrations, wherein the tray further comprises a plurality of buttons, wherein each button is within a corresponding cell.

Illustration 85. The troche mold assembly of any preceding or subsequent illustrations or combination of illustrations, wherein each button is within the corresponding cell between the top side and the bottom side of the frame.

Illustration 86. The troche mold assembly of any preceding or subsequent illustrations or combination of illustrations, wherein each button comprises a center portion, a first hinge line adjacent to the cell wall, and a second hinge line between the first hinge line and the center portion.

Illustration 87. The troche mold assembly of any preceding or subsequent illustrations or combination of illustrations wherein the first hinge line and the second hinge line each define a closed perimeter.

Illustration 88. The troche mold assembly of any preceding or subsequent illustrations or combination of illustrations, wherein each cell comprises a cell wall, wherein each button comprises a button surface, and wherein the button surface of each button comprises a score rib extending in a transverse dimension along the button surface and such that a gap is defined between an end of the score rib and the cell wall.

Illustration 89. The troche mold assembly of any preceding or subsequent illustrations or combination of illustrations, wherein the score rib is a first score rib and wherein the button surface of each button comprises a second score rib extending perpendicular to the first score rib across the button surface and such that a gap is defined between an end of the second score rib and the cell wall.

Illustration 90. The troche mold assembly of any preceding or subsequent illustrations or combination of illustrations, wherein each button comprises a center portion, a first hinge line adjacent to the cell wall, and a second hinge line between the first hinge line and the center portion, and wherein a portion of the first hinge line and a portion of the second hinge line are between the end of the score rib and the cell wall.

Illustration 91. The troche mold assembly of any preceding or subsequent illustrations or combination of illustrations, wherein each button is flexible relative to the frame.

Illustration 92. The troche mold assembly of any preceding or subsequent illustrations or combination of illustrations wherein: an end of the first side wall opposite from the base comprises a first flange extending partially over the base and towards the second side wall; an end of the second side wall opposite from the base comprises a second flange extending partially over the base and towards the first side wall and such that at least a portion of the base is not covered by the first flange or the second flange; and the first flange and the second flange partially define the receiving area.

Illustration 93. The troche mold of any preceding or subsequent illustrations or combination of illustrations, wherein an end of the base opposite from the end wall, an end of the first side wall opposite from the end wall, and an end of the second side wall opposite from the end wall define a receiving slot providing access to the receiving area, and wherein the tray is slidable through the receiving slot.

Illustration 94. The troche mold assembly of any preceding or subsequent illustrations or combination of illustrations, wherein: the first side wall of the cover comprises a first cover engagement feature within the receiving area; the second side wall of the cover comprises a second cover engagement feature within the receiving area; the tray further comprises a first tray engagement feature on a first side of the frame and a second tray engagement feature on a second side of the frame opposite from the first side; and the first tray engagement feature is engageable with the first cover engagement feature and the second tray engagement feature is engageable with the second cover engagement feature to selectively retain at least a portion of the tray within the receiving area.

Illustration 95. The troche mold assembly of any preceding or subsequent illustrations or combination of illustrations, wherein the locating rib is a first locating rib; and wherein the cover further comprises a second locating rib extending from the base within the receiving area and between the first locating rib and the second side wall.

Illustration 96. The troche mold assembly of any preceding or subsequent illustrations or combination of illustrations, wherein the locating rib comprises a leading feature proximate to a receiving slot of the cover providing access to the receiving area, wherein the leading feature comprises a varying height.

Illustration 97. The troche mold assembly of any preceding or subsequent illustrations or combination of illustrations, wherein an edge of the end wall opposite from the base comprises a cutout, and wherein a width of the cutout is less than a distance between the first side wall and the second side wall.

Illustration 98. The troche mold assembly of any preceding or subsequent illustrations or combination of illustrations, wherein the first side wall comprises a first gripping portion and wherein the second side wall comprises a second gripping portion.

Illustration 99. The troche mold assembly of any preceding or subsequent illustrations or combination of illustrations, wherein the first gripping portion and the second gripping portion each comprise a plurality of gripping ribs.

Illustration 100. The troche mold assembly of any preceding or subsequent illustrations or combination of illustrations, wherein the top side of the frame is planar.

Illustration 101. The troche mold assembly of any preceding or subsequent illustrations or combination of illustrations, wherein each cell comprises a cell wall, and wherein the cell wall is drafted at a non-zero angle relative to a vertical axis of the frame.

Illustration 102. The troche mold assembly v, wherein the angle is from 3° to 8°.

Illustration 103. A troche mold comprising: a tray defining a main chamber; and a grid comprising a body defining at least one cell, wherein the body of the grid is removably positioned within the main chamber.

Illustration 104. The troche mold of any preceding or subsequent illustrations or combination of illustrations, further comprising a cover, wherein the cover is configured to selectively cover the grid positioned within the main chamber of the tray.

Illustration 105. A tray for a troche mold comprising a body defining a main chamber and a fill-indication ramp in fluid communication with the main chamber.

Illustration 106. A tray for a troche mold comprising a body defining a main chamber and at least one button in the main chamber, wherein a thickness of the button is different from a non-button portion of the main chamber.

Illustration 107. A grid for a troche mold comprising a mounting surface and a body, wherein the body defines at least one cell, and wherein the at least one cell is drafted at a non-zero draft angle.

Illustration 108. A troche formed using any troche mold, troche mold assembly, and/or other component of any preceding or subsequent illustrations or combination of illustrations.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A troche mold assembly comprising:

a cover defining a receiving area; and a monolithic tray comprising a body defining a plurality of cells and a plurality of buttons, wherein each cell is configured to receive a medicament, wherein each cell of the plurality of cells comprises a corresponding button of the plurality of buttons between a top side and a bottom side of the tray, and wherein the tray is positionable within the receiving area of the cover.

2. The troche mold assembly of claim 1, wherein each cell comprises a cell wall, wherein each button comprises a center portion, a first hinge line adjacent to the cell wall, and a second hinge line between the first hinge line and the center portion.

3. The troche mold assembly of claim 1, wherein each cell comprises a cell wall, wherein each button comprises a button surface, and wherein the button surface of each button comprises a score rib extending in a transverse dimension along the button surface and such that a gap is defined between an end of the score rib and the cell wall.

4. The troche mold assembly of claim 1, wherein each button is flexible.

5. The troche mold assembly of claim 1, wherein the cover comprises:

a base;

a first side wall extending from the base;

a second side wall extending from the base opposite from the first side wall; and an end wall extending from the base and between the first side wall and the second side wall, wherein the base, the first side wall, the second side wall, and the end wall define the receiving area.

6. The troche mold assembly of claim 5, wherein:

an end of the first side wall opposite from the base comprises a first flange extending partially over the base and towards the second side wall;

an end of the second side wall opposite from the base comprises a second flange extending partially over the base and towards the first side wall and such that at least a portion of the base is not covered by the first flange or the second flange; and the first flange and the second flange partially define the receiving area.

7. The troche mold assembly of claim 5, wherein an end of the base opposite from the end wall, an end of the first side wall opposite from the end wall, and an end of the second side wall opposite from the end wall define a receiving slot providing access to the receiving area, and wherein the tray is slidable through the receiving slot.

8. The troche mold assembly of claim 5, wherein:

the first side wall of the cover comprises a first cover engagement feature within the receiving area;

the second side wall of the cover comprises a second cover engagement feature within the receiving area;

the tray further comprises a first tray engagement feature on a first side of the tray and a second tray engagement feature on a second side of the tray opposite from the first side; and the first tray engagement feature is engageable with the first cover engagement feature and the second tray engagement feature is engageable with the second cover engagement feature to selectively retain at least a portion of the tray within the receiving area.

9. The troche mold assembly of claim 5, wherein:

the cover further comprises a locating rib extending from the base within the receiving area and between the first side wall and the second side wall;

a height of the locating rib is less than a height of the first side wall and less than a height of the second side wall; and the tray is removably positioned within the receiving area such that the locating rib contacts the top side of the tray and the top side of the tray is spaced apart from the base within the receiving area.

10. A troche mold assembly comprising:

a cover defining a receiving area, wherein the cover defines at least two openings to the receiving area, the at least two openings in at least two different directions; and a tray defining a plurality of cells, wherein each cell is configured to receive a medicament, wherein each cell comprises a button within the cell between a top side and a bottom side of the tray, wherein the button comprises a button surface with at least one score rib extending along the button surface and corresponding to a sub-dosage of a troche, and wherein the tray is positionable within the receiving area of the cover.

11. The troche mold assembly of claim 10, wherein each cell comprises a button, and wherein each button is within the corresponding cell.

12. The troche mold assembly of claim 10, a first opening of the at least two openings is defined in a side of the cover, and a second opening of the at least two openings is defined in a bottom side of the cover.

13. The troche mold assembly of claim 10, wherein the cover comprises:

a base;

a first side wall extending from the base;

a second side wall extending from the base opposite from the first side wall; and an end wall extending from the base and between the first side wall and the second side wall, wherein the base, the first side wall, the second side wall, and the end wall define the receiving area.

14. The troche mold assembly of claim 13, wherein:

an end of the first side wall opposite from the base comprises a first flange extending partially over the base and towards the second side wall;

an end of the second side wall opposite from the base comprises a second flange extending partially over the base and towards the first side wall and such that at least a portion of the base is not covered by the first flange or the second flange; and the first flange and the second flange partially define the receiving area.

15. A troche mold assembly comprising:

a cover comprising a base at least partially defining a receiving area with at least one locating rib wherein a height of the at least one locating rib is less than a height of the receiving area; and a tray comprising a plurality of cells, and wherein each cell is configured to receive a medicament, wherein the tray is removably positioned within the receiving area such that the at least one locating rib contacts the tray, wherein, when the at least one locating rib contacts the tray, the at least one locating rib positions and spaces the tray apart from the base within the receiving area, wherein the tray further comprises a plurality of buttons, wherein each button is within a corresponding cell, wherein each button is flexible, and wherein each button is within the corresponding cell between a top side and a bottom side of the tray, wherein each cell comprises a cell wall, wherein each button comprises a center portion, a first hinge line adjacent to the cell wall, and a second hinge line between the first hinge line and the center portion, and wherein the first hinge line and the second hinge line each define a closed perimeter.

16. The troche mold assembly of claim 15, wherein the cover further comprises a first flange and a second flange opposite from the base, wherein the first flange and the second flange partially define the receiving area.

17. The troche mold assembly of claim 15, wherein the at least one locating rib is a first locating rib, and wherein the cover further comprises a second locating rib extending from the base within the receiving area and between the first locating rib and a side wall of the cover.

18. The troche mold assembly of claim 15, wherein the at least one locating rib comprises a leading feature proximate to a receiving slot of the cover that provides access to the receiving area, wherein the leading feature comprises a varying height.

* * * * *